United States Patent
Forsberg et al.

(10) Patent No.: US 11,877,376 B2
(45) Date of Patent: Jan. 16, 2024

(54) ELECTRICALLY CONDUCTIVE FIREBRICK SYSTEM

(71) Applicant: Massachusetts Institute of Technology, Cambridge, MA (US)

(72) Inventors: Charles Forsberg, Lexington, MA (US); Daniel C. Stack, Middletown, NY (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 263 days.

(21) Appl. No.: 17/462,244

(22) Filed: Aug. 31, 2021

(65) Prior Publication Data
US 2022/0132633 A1    Apr. 28, 2022

Related U.S. Application Data

(60) Provisional application No. 63/104,681, filed on Oct. 23, 2020.

(51) Int. Cl.
*H05B 7/06*    (2006.01)

(52) U.S. Cl.
CPC ..................................... *H05B 7/06* (2013.01)

(58) Field of Classification Search
CPC ... H05B 7/06; H05B 3/12; H05B 3/14; H05B 3/24; Y02E 60/14; F24H 2250/10; F24H 3/062; H01M 4/02; H01M 4/04; H01M 4/661; H01M 4/663; H01M 4/664; H01M 4/70; H01M 4/86; H01M 4/8605; H01M 4/88

See application file for complete search history.

(56) References Cited

U.S. PATENT DOCUMENTS

| | | |
|---|---|---|
| 2017/0363368 A1 | 12/2017 | Bergan et al. |
| 2018/0137991 A1 | 5/2018 | Roumi et al. |

OTHER PUBLICATIONS

Deshmukh, Industrial Heating "Principles, Techniques, Materials, Applications, and Design." Textbook, 2005, 776 pages.
Forsberg et al. "Basis for Fluoride-Salt-Cooled High-Temperature Reactors with Nuclear Air-Brayton Combined Cycles and Firebrick Resistance-Heated Energy Storage," Nuclear Technology, Oct. 2016; 22 pages.

(Continued)

*Primary Examiner* — Hung D Nguyen
(74) *Attorney, Agent, or Firm* — DALY, CROWLEY, MOFFORD & DURKEE, LLP

(57) ABSTRACT

A thermal energy storage system includes a firebrick checkerwork and an electrode. The firebrick checkerwork includes one or more conductive firebrick layers, each including a plurality of electrically conductive doped metal oxide firebricks with one or more airflow vents. The electrode includes one or more electrode firebrick layers, each layer including a plurality of electrode firebricks. The firebrick checkerwork is heated due to application of electrical power to the electrode. Air flowing through the firebrick checkerwork may then be heated for use in heat-related applications (e.g., an industrial application, commercial application, residential application, transportation application, etc.) some of which may relate to electricity production or in other applications which may relate to other purposes that require heat that are unrelated to electricity production.

20 Claims, 18 Drawing Sheets

(56) References Cited

OTHER PUBLICATIONS

Stack, Conceptual Design and Performance Characteristics of Firebrick Resistance-Heated Energy Storage for Industrial Heat Supply and Variable Electricity Production, MS Thesis, Department of Nuclear Science and Engineering, Massachusetts Institute of Technology, Feb. 2017, 166 pages.

Ibekwe et al., "Firebrick Resistance-heated Energy Storage: Existing Technology Base;" 2015 ANS Winter Meeting and Nuclear Technology Expo; Nov. 2015; 6 Pages.

Periodic Table, "Valence of the Elements;" retrieved from https://periodictable.com/Properties/A/Valence.al.html on Nov. 16, 2021; 2 Pages.

Stack, "Conceptual Design and Performance Characteristics of Firebrick Resistance-Heated Energy Storage for Industrial Heat Supply and Variable Electricity Production;" Submitted to the Department of Nuclear Science and Engineering in Partial Fulfillment of the Requirements at Massachusetts Institute of Technology; Feb. 2017; 12 Pages.

Stack, "Development of High-Temperature Firebrick Resistance-Heated Energy Storage (FIRES) Using Doped Ceramic Heating System;" Abstract Only; Submitted to the Department of Nuclear Science and Engineering in Partial Fulfillment of the Requirements at Massachusetts Institute of Technology; Feb. 2021; 2 Pages.

Wikipedia, "Zirconium Dioxide;" retrieved from https://en.wikipedia.com/wiki/zirconium_dioxide; Last edited on Sep. 17, 2021; 6 Pages.

PCT International Search Report dated Dec. 15, 2021 for International Application No. PCT/US2021/048393; 12 Pages.

Andreades, et al.; "Design of the Mark-I Pebble-Bed Fluoride Salt-Cooled High-Temperature Reactor Commercial Power Plant;" ANS; Nuclear Technology; vol. 195; Sep. 2016; 16 pages.

Andreades, et al.; "Reheat-Air Brayton Combined Cycle Power Conversion Design and Performance Under Nominal Ambient Conditions;" Journal of Engineering for Gas Turbines and Power; vol. 136; Jun. 2014; 12 pages.

Annual Energy Outlook 2020 with Projections to 2050; U.S. Energy Information Administration; Jan. 2020; 81 pages.

Akhtar, et al.; "From Coal to Natural Gas—Its Impact on Kiln Production, Clinker Quality and Emissions;" IEEE Cement Industry Technical Conference 2013, Jan. 2013; 24 pages.

Arca, et al.; "Effect of Chemical Precursors On the Optical and Electrical Properties of p-Type Transparent Conducting Cr2O3:(Mg,N);" The Journal of Physical Chemistry C, 2013; vol. 17; Apr. 29, 2013; 7 pages.

Arca, et al.; "Valence Band Modification of Cr2O3 by Ni-Doping: Creating A High Figure of Merit P-Type TCO;" Journal of Materials Chemistry C; 2017; vol. 5; Aug. 7, 2017; 9 pages.

Arca, et al.; "Band Alignment at The Interface Between Ni-Doped Cr2O3 and Al-Doped Zno: Implications for Transparent P—N Junctions;" Journal of Physics: Condensed Matter; vol. 28; Jan. 2016; 10 pages.

Badwal; "Electrical Conductivity of Single Crystal and Polycrystalline Yttria-Stabilized Zirconia;" Journal of Materials Science; vol. 19; Jan. 1984; 10 pages.

Baumard, et al.; Electrical Conductivity and Charge Compensation in Nb Doped TiO2 Rutile; The Journal of Chemical Physics; vol. 67; Jan. 1977; 5 pages.

Bennett, et al.; Failure Mechanisms in High Chrome Oxide Gasifier Refractories; Metallurgical and Materials Transactions A; vol. 42A; Apr. 2011; 17 pages.

Bosman, et al.; "Mechanisms of the Electrical Conduction in Li-Doped NiO;" Physical Review; vol. 144; No. 2; Apr. 15, 1966; 8 pages.

Bosman, et al.; "Small-Polaron Versus Band Conduction in Some Transition-Metal Oxides;" Advances in Physics; vol. 19; No. 77; Jan. 1970; 118 pages.

Boyce; "Advanced Industrial Gas Turbines for Power Generation;" Combined Cycle Systems for Near[1]Zero Emission Power Generation; Jan. 2012; 59 pages.

Brook, et al.; "Electrochemical Cells and Electrical Conduction of Pure and Doped $Al_2O_3$;" Journal of the American Ceramic Society; vol. 54; Jan. 25, 1971; 8 pages.

Blanke; California ISO; "Q3 Report on Market Issues and Performance;" Dec. 5, 2019; 112 pages.

Callister, et al.; "Sintering Chromium Oxide with the Aid of TiO2;" Journal of the American Ceramic Society; vol. 62; No. 3-4; May 17, 1976; 4 pages.

Chen, et al.; "MgO-doped Cr2O3, Solubility Limit and The Effect of Doping on The Resistivity and Ethanol Sensitivity;" Sensors and Actuators B, vol. 9; Jan. 10, 1992; 5 pages.

Chiochetti, et al.; "Electrical Conductivity of Some Commercial Refractories in the Temperature Range 600° to 1500° C.;" Journal of the American Ceramic Society; vol. 36; Aug. 21, 1952; 5 pages.

Chu, et al.; "The Ac Electrical Behavior of Polycrystalline ZrO2—CaO;" Journal of Solid State Chemistry; vol. 23; Jan. 1978; 18 pages.

Cole, et al.; Cost projections for Utility-Scale Battery Storage: 2021 Update; National Renewable Energy Laboratory; Technical Report; Jun. 2021; 21 pages.

Corus; "Hot Blast Stoves;" Ironmaking and Steelmaking; Jan. 18, 2021; 4 pages.

Crawford, et al.; Electrical Conductivity of Single-Crystal $Cr_2O_3$; Journal of Applied Physics; vol. 35; Jan. 1964; 7 pages.

Denholm, et al.; "Energy Storage Requirements for Achieving 50% Penetration of Solar Photovoltaic Energy in California;" NREL; Technical Report; Aug. 2016; 45 pages.

Du, et al.; "Impurity-Bound Small Polarons in ZnO: Hybrid Density Functional Calculations;" Physical Review B 80, Jan. 2009; 5 pages.

EIA; "International Energy Outlook 2021 with Projections to 2050;" Jan. 2020; 42 pages.

Forsberg, et al.; Converting Excess Low-Price Electricity into High-Temperature Stored Heat for Industry and High-Value Electricity Production; The Electricity Journal; vol. 30; Aug. 31, 2017; 11 pages.

Forsberg; "Development Strategy for Gas Turbines with Firebrick Resistance-Heated Energy Storage to Enable Nuclear-Renewable Grid Integration;" American Nuclear Society Annual Meeting; No. 21735; Jun. 11-15, 2017; 4 pages.

French; "Electronic Band Structure of $Al_2O_3$, With Comparison to AlON and AlN;" Journal of the American Ceramic Society; vol. 73; Jan. 1990; 13 pages.

Gasia, et al.; "Review on System and Material Requirements for High Temperature Thermal Energy Storage. Part 1: General requirements;" Renewable and Sustainable Energy Reviews; vol. 75; Jan. 2017; 19 pages.

Gil, et al.; "State of the Art on High Temperature Thermal Energy Storage for Power Generation. Part 1—Concepts, Materials and Modellization;" Renewable and Sustainable Energy Review; vol. 14; Jan. 2010; 25 pages.

Gnesin, et al.; "Volume Electrical Resistivity Of Silicon Carbide Heating Elements;" Plenum Publishing Corporation; Jan. 1978; 5 pages.

Graham, et al.; "Oxidation/Vaporization Kinetics of $Cr_2O_3$;" Journal of the American Ceramic Society; vol. 54; Feb. 1971; 5 pages.

Harbison-Walker; "Harbison-Walker Handbook of Refractory Practice;" HarbisonWalker International; Jan. 2005; 331 pages.

Hensler, et al.; "Electrical Resistance of Some Refractory Oxides and Their Mixtures in the Temperature Range 600 to 1500 C;" Journal of the American Ceramic Society; vol. 36; Apr. 1, 1952; 8 pages.

Hirata, et al.; "Sintering Behavior of Cr2O3—Al2O3 Ceramics;" Journal of the European Ceramic Society; vol. 20; Jan. 2000; 5 pages.

Hitosugi, et al.; "Properties of TiO2-Based Transparent Conducting Oxides;" Phys. Status Solidi A 207; No. 7; Apr. 2010; 9 pages.

Holt, et al.; "Electrical Conductivity and Defect Structure of $Cr_2O_3$. II. Reduced Temperatures (< ~ 1000° C.);" Solid State Ionics; vol. 69; Mar. 1994; 7 pages.

(56) References Cited

OTHER PUBLICATIONS

Huang, et al.; "Oxygen Activity Dependence of the Electrical Conductivity of Li-Doped $Cr_2O_3$;" Journal of the American Ceramic Society; vol. 67; No. 2; Jun. 1983; 5 pages.
Hutson; "Hall Effect Studies of Doped Zinc Oxide Single Crystals;" Physical Review; vol. 108; No. 2; Oct. 15, 1957; 9 pages.
IEA; "The Challenge Of Reaching Zero Emissions In Heavy Industry;" Article 19; Sep. 2020; 9 pages.
Institute for Industrial Productivity; "Blast Furnace System;" Jan. 19, 2021; 6 pages.
Ismail, et al.; "Photochemical Splitting Of Water For Hydrogen Production By Photocatalysis: A review;".Solar Energy Materials and Solar Cells; vol. 128; Jan. 2014; 17 pages.
Janotti, et al.; "Fundamentals of Zinc Oxide as a Semiconductor;" Reports on Progress in Physics; vol. 72; Feb. 10, 2009; 29 pages.
Kanthal; "Super Electric Heating Elements;" in Products and Accessories; Jan. 2012; 36 pages.
Kehoe, et al.; Assessing the Potential of Mg-Doped $Cr_2O_3$ as a Novel P-Type Transparent Conducting Oxide; Journal of Physics: Condensed Matter; vol. 28; Jan. 2016; 13 pages.
Koch, et al.; "Contact Resistance at Ceramic Interfaces and Its Dependence On Mechanical Load;" Solid State Ionics; vol. 168; Jan. 9, 2004; 11 pages.
Kosacki, et al.; Electrical Conductivity of Nanocrystalline Ceria and Zirconia Thin Films; Solid State Ionics; vol. 136-137; Jan. 2000; 9 pages.
Laing, et al.; Using Concrete and Other Solid Storage Media in Thermal Energy Storage (TES) Systems; Advances in Thermal Energy Storage Systems; Jan. 2015; 22 pages.
Lany; "Band-Structure Calculations for the 3d Transition Metal Oxides in GW;" Physical Review B; vol. 87; Jan. 2013; 9 pages.
Lany; "Semiconducting Transition Metal Oxides;" J Phys. Condens. Matter; vol. 27; Jun. 30, 2015; 19 pages.
Lee, et al.; "Electrical Conductivity of CeO2-Doped YSZ;" Solid State Ionics; vol. 135; Jan. 2000; 9 pages.
Lin, et al.; "Polarization of High-Permittivity Dielectric NiO-Based Ceramics;". Journal of the American Ceramic Society; vol. 88; Jan. 20, 2005; 4 pages.
Look, et al.; "Electrical Properties of Bulk ZnO;" Solid State Communications; vol. 105; Aug. 1997; 3 pages.
Lu, et al.; "The Thermal Shock Resistance of Solids;" Acta Mater.; vol. 46; No. 13; Mar. 28, 1998; 14 pages.
Min, et al.; "High Temperature Heat Exchanger Studies for Applications To Gas Turbines;" Heat and Mass Transfer; vol. 46; Jun. 23, 2009; 12 pages.
MIT; The Future of Solar Energy; An Interdisciplinary MIT Study; Jan. 2015; Part 1 of 4; 125 pages.
MIT; The Future of Solar Energy; An Interdisciplinary MIT Study; Jan. 2015; Part 2 of 4; 75 pages.
MIT; The Future of Solar Energy; An Interdisciplinary MIT Study; Jan. 2015; Part 3 of 4; 75 pages.
MIT; The Future of Solar Energy; An Interdisciplinary MIT Study; Jan. 2015; Part 4 of 4; 81 pages.
Mitsubishi Heavy Industries; MHI Achieves 1,600° C. Turbine Inlet Temperature in Test Operation of World's Highest Thermal Efficiency "J-Series Gas Turbine;" May 26, 2011; 2 pages.
Mohapatra, et al.; "Defect Structure of $\alpha$-$Al_2O_3$ Doped with Magnesium;" Journal of the American Ceramic Society; Mar. 1, 1976; 8 pages.
Mohapatra, et al.; "Defect Structure of $\alpha Al_2O_3$ Doped with Titanium;" Journal of the American Ceramic Society; Dec. 13, 1976; 7 pages.
Muan, et al.; "Phase Equilibrium Studies in the System Iron Oxide-$Al_2O_3$—$Cr_2O_3$;" Journal of the American Ceramic Society; vol. 42; Dec. 1959; 11 pages.
Nagai, et al.; "Effect of $TiO_2$ on the Sintering and the Electrical Conductivity of $Cr_2O_3$;" Journal of the American Ceramic Society; vol. 72; Jan. 1989; 4 pages.

Nagai, et al.; "Electrical Conductivity of $Cr_2O_3$ Doped with $La_2O_3 Y_2O_3$ and NiO;" Transactions of the Japan Institute of Metals, vol. 24; No. 8; Jan. 1983; 8 pages.
Nagaraja, et al.; "Band or Polaron: The Hole Conduction Mechanism in the p-Type Spinel $Rh_2ZnO_4$;" Journal of the American Ceramic Society; vol. 95; Jan. 2012; 6 pages.
Naik, et al.; "Small-Polaron Mobility in Nonstoichiometric Cerium Dioxide;" J Phys Chem Solids; vol. 39; Jan. 1978; 5 pages.
Özgür, et al.; "A comprehensive review of ZnO materials and devices;" Journal of Applied Physics; vol. 98; Feb. 2, 2005; 104 pages.
Park, et al.; "Electrical Conductivity and Defect Models of MgO-Doped $Cr_2O_3$;" Journal of the American Ceramics Society; vol. 71; Jan. 1988; 4 pages.
Park, et al.; "Electronic Transport in Thermally Grown $Cr_2O_3$;" Oxidation of Metals; vol. 33; No. ½; Jan. 1990; 24 pages.
Pelissier, et al.; "Silicon Carbide Heating Elements;" Ceramics International; vol. 24; Jan. 1998; 7 pages.
Pieper, et al.; "Comprehensive Analytical Approach to Predicting Freeze-Out and Exhaustion for Uniform Single-Impurity Semiconductors in Equilibrium;" IEEE Transactions on Education; vol. 48; Sep. 2005; 10 pages.
Pieper, et al.; "An Exact Analysis for Freeze-Out And Exhaustion In Single Impurity Semiconductors;" Proceedings of the 2005 American Society of Engineering Education Annual Conference; Jan. 2005; 12 pages.
Praveen, et al.; "Electronic Band Gaps of Ternary Corundum Solid Solutions from $Fe_2O_3$—$Cr_2O_3$—$Al_2O_3$ System For Photocatalytic Applications: A Theoretical Study;" Computational Materials Science; vol. 55; Jan. 12, 2012; 7 pages.
Prot, et al.; "Self-diffusion in $\alpha$-$Al_2O_3$. II. Oxygen Diffusion in 'Undoped' Single Crystals;" Philosophical Magazine A; Sep. 27, 2006; 20 pages.
Quadrennial Technology Review; "An Assessment of Energy Technologies and Research Opportunities;" Sep. 2015; Part 1 of 2; 270 pages.
Quadrennial Technology Review; "An Assessment of Energy Technologies and Research Opportunities;" Sep. 2015; Part 2 of 2; 234 pages.
Quemener; "Electrical Characterization of Bulk and Thin Film Zinc Oxide;" Department of Physics; University of Oslo; Mar. 2012; 106 pages.
Rissman, et al., "Technologies and Policies to Decarbonize Global Industry: Review and assessment of mitigation drivers through 2070;" Applied Energy; vol. 266; Mar. 12, 2020; 34 pages.
Roy, et al.; "Sintering Kinetics of Pure and Doped Chromium Oxide;" Journal of Materials Science; vol. 21; Jan. 1986; 4 pages.
Schmidt, et al.; "The Future Cost of Electrical Energy Storage Based on Experience Rates;" Nature Energy, Analysis; Article No. 17110; vol. 2; Jul. 10, 2017; 8 pages.
Schmidt, et al.; "The Future Cost of Electrical Energy Storage Based on Experience Rates;" Nature Energy, Supplementary Information; Article No. 17110; vol. 2; Jul. 10, 2017; 37 pages.
Schmidt, et al.; "Projecting the Future Levelized Cost of Electricity Storage Technologies;" Joule; Jan. 16, 2019; 21 pages.
Schonberger, et al.; "Bulk and Surface Electronic Structures of MgO;" Phys Rev B; vol. 52; No. 12; Sep. 15, 1995; 6 pages.
Shluger, et al.; "Small Polarons in Real Crystals: Concepts and Problems;" Journal of Physics: Condensed Matter; vol. 5; Jan. 1993; 39 pages.
Shluger, et al.; "Theoretical Simulation of Localized Holes in MgO;" Journal of Physics: Condensed Matter; vol. 4; Jan. 1992; 13 pages.
Siddique, et al.; "Electric Transport and Enhanced Dielectric Permittivity in Pure and Al Doped NiO Nanostructures;" Journal of Alloys and Compounds; vol. 735; Jan. 2018; 14 pages.
Smith, et al.; Intrinsic Conductivity in Magnesium-Oxygen Battery Discharge Products: MgO and $MgO_2$; Chemistry of Materials; vol. 29; Jan. 17, 2017; 12 pages.
Stack, et al.; "Conceptual Design and Market Assessment of Firebrick Resistance Heated Energy Storage (Fires)—Avoiding Wind and Solar Electricity Price Collapse to Improve Nuclear, Wind, and

(56) References Cited

OTHER PUBLICATIONS

Solar Economics;" International Congress Advanced Nuclear Power Plants (ICAPP); Apr. 17-20, 2016; 14 pages.

Stack, et al.; "Performance of Firebrick Resistance-Heated Energy Storage for Industrial Heat Applications and Round-Trip Electricity Storage;" Applied Energy 242; Feb. 15, 2019; 15 page.

Stoneham; "Small Polarons and Polaron Transitions;" J. Chem. Soc., Faraday Trans. 2; vol. 85; Jan. 1, 1989; 12 pages.

Takata, et al.; "Dependence of Electrical Conductivity of ZnO on Degree of Sintering;" Journal of the American Ceramic Society—Takata; vol. 59; No. 1-2; Apr. 19, 1975; 5 pages.

Varley, et al.; "Role of Self-Trapping in Luminescence and P-Type Conductivity of Wide-Band-Gap Oxides;" Physical Review B, vol. 85; Jan. 2012; 4 pages.

Warman, et al.; "Electronic Processes in Semiconductor Materials Studied by Nanosecond Time-Resolved Microwave Conductivity-III—$Al_2O_3$, Mgo and $Tio_2$ Powders;" Radiat. Phys. Chem.; vol. 37; No. 3; Jan. 1991; 10 pages.

World Coal Association; "How is Steel Produced;" Select Language; Member/Portal; https://www.worldcoal.org/coal/uses-coal/how-steel-produced; Jan. 21, 2021; 5 pages.

Zaleska, et al.; "Doped-$TiO_2$: A Review;" Recent Patents on Engineering; vol. 2; May 28, 2008; 9 pages.

Zetterholm; "Modelling of a Hot Stove for the Blast Furnace;" Luleå University of Technology; Master's Thesis; Jan. 2014; 51 pages.

Zhou; "Current Energy Situation & Application Prospect of FIRES in China;" Shanghai Institute of Applied Physics; TMSR-SINAP-CAS; Jan. 2017; 33 pages.

Ziegler, et al.; "Electrical Properties and Non-Stoichiometry in ZnO Single Crystals;" Phys. Status Sol. (a); vol. 66; Jan. 1981; 14 pages.

100

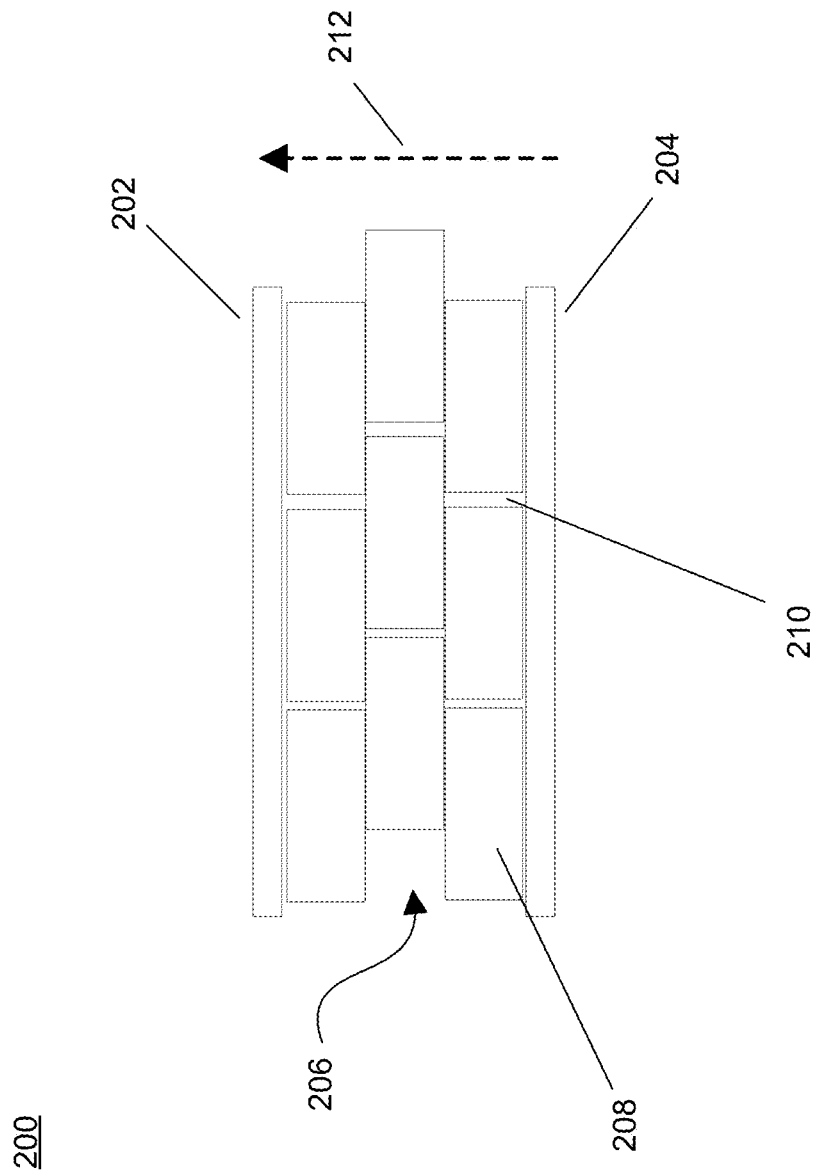

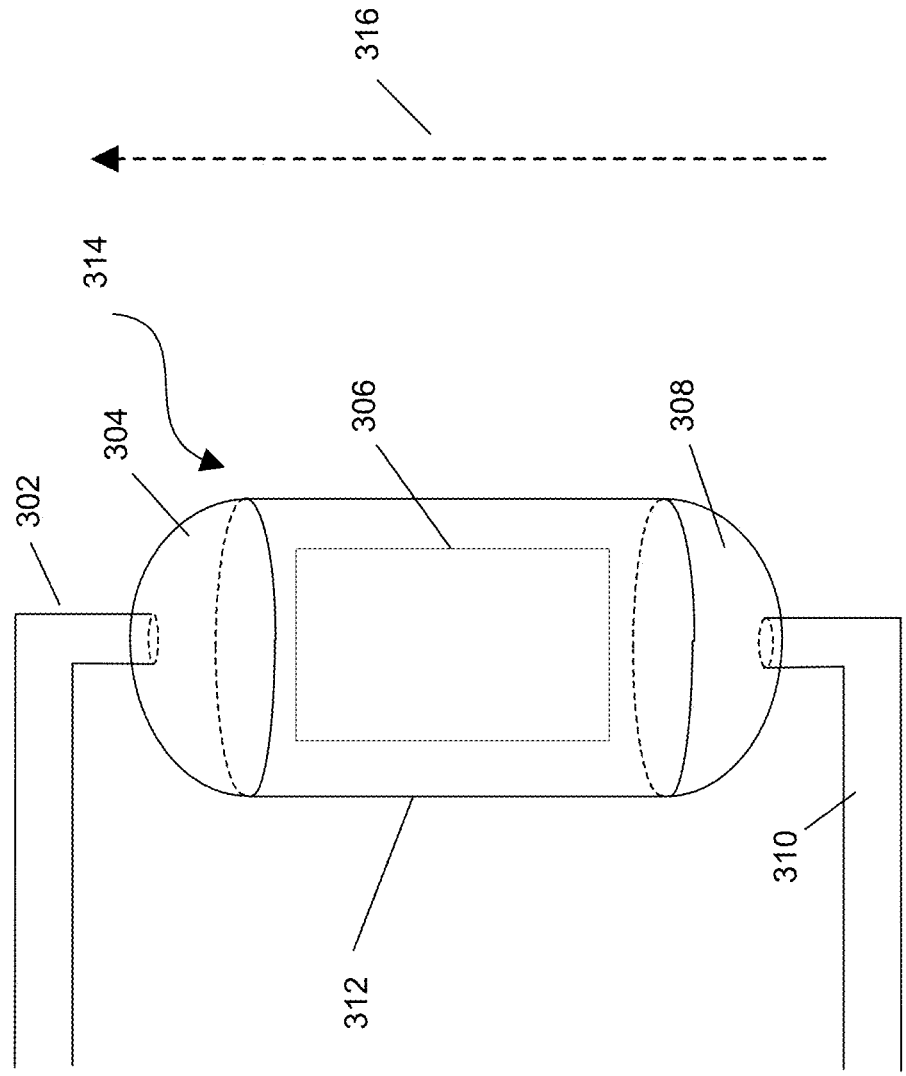

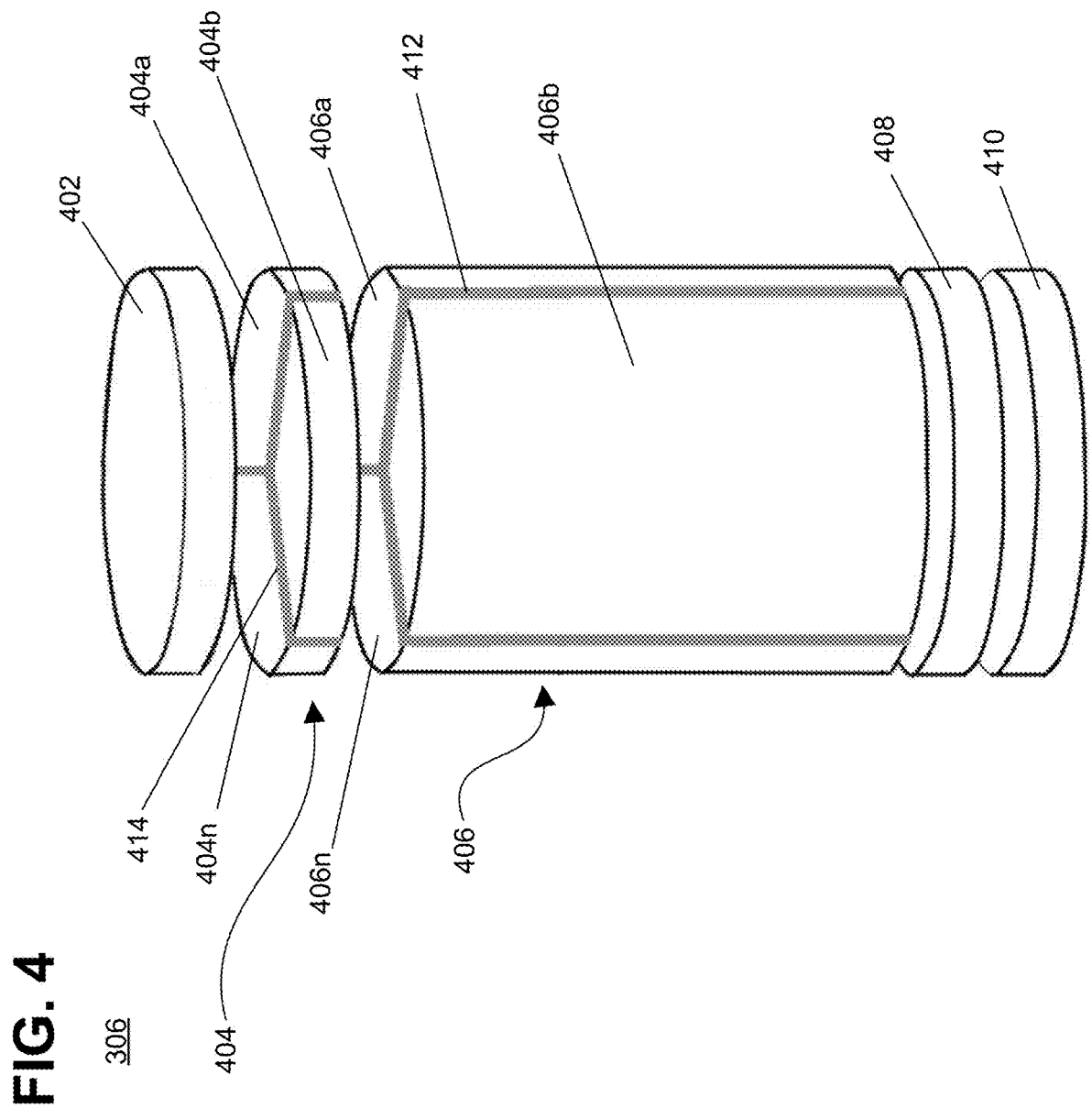

500

700

720

1000

1100

ELECTRICALLY CONDUCTIVE FIREBRICK SYSTEM

FIELD

One or more embodiments described herein relate to managing energy storage.

BACKGROUND

The modern energy generation and distribution network (the "power grid") includes many different power generation sources. While some generators can operate at a relatively continuous output (e.g., traditional power plants such as coal, oil, natural gas, nuclear, etc.), other power sources such as solar or wind may vary in generation capability, for example, based on environmental factors. As increasing solar and wind generators are brought online to reduce greenhouse gas emissions, expansion of the power storage capabilities of the power grid may account for variability in output power. However, present battery technologies have proven to be unsatisfactory and are very costly to implement. Attempts have been made to use other types of energy storage systems, such as pumped hydroelectric storage. However, these other systems are site-limited and not readily available or deployable.

SUMMARY

One or more embodiments described herein provide an improved energy storage system and method which may be used for a variety of applications, not the least of which includes storing power in a power grid.

These and/or other embodiments provide an energy storage system and method which control the storage of power in order to offset variability in the output of one or more power sources of the grid, including, but not limited to, variability in the output power of solar generators, wind generators, and other power sources subject to inconsistent performance due to environmental and/or other factors.

These and/or other embodiments provide an improved energy storage system and method which is readily deployable in a variety of contexts.

These and/or other embodiments provide an improved energy storage system and method which is economical to implement.

In accordance with one or more embodiments, a thermal energy storage system includes a firebrick checkerwork comprising one or more conductive firebrick layers, each conductive firebrick layer comprising a plurality of electrically conductive doped metal oxide firebricks having one or more vents to allow airflow through the firebrick checkerwork; and a first electrode comprising one or more electrode firebrick layers, each electrode firebrick layer comprising a plurality of electrode firebricks, the first electrode configured to receive electrical power from a source; wherein the firebrick checkerwork is heated due to application of the received electrical power. With such an arrangement, air flowing through the firebrick checkerwork may be heated by the firebrick checkerwork to provide heat for a wide variety of uses including but not limited to residential heat uses, industrial heat uses, commercial heat uses, transportation uses and/or electrical production (which may take place in any or all of residential, industrial, commercial, and transportation settings). The concepts described herein may find use in both the high-temperature heat market as well as the electricity market. Accordingly, after reading the descriptions provided herein, those of ordinary skill in the art will appreciate that the heat storage system and other embodiments described herein can provide heat to all types of heat users and heat-related applications (e.g., an industrial application, commercial application, residential application, transportation application, etc.). It will further be appreciated that some of these applications may relate to electricity production, but other applications may relate to other purposes that require heat that are unrelated to heat production. Thus, while one or more embodiments may serve in some cases as an effective replacement for a battery, other embodiments may be used in various other contexts such as for providing heat for virtually any purpose.

In accordance with one or more embodiments, an apparatus includes a first electrode; a second electrode; and electrically conductive firebricks, wherein the electrically conductive firebricks are disposed between the first electrode and the second electrode in a predetermined pattern, each of the electrically conductive firebricks including a doped metal oxide material configured to generate heat based on an electric potential applied between the first electrode and the second electrode.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 2D is a block diagram of an illustrative electrically heated thermal energy storage (E-TES) system employing conductive firebricks in accordance with described embodiments;

FIG. 3 is a diagram of an illustrative vessel system for containing an E-TES system in accordance with described embodiments;

FIG. 4 is a diagram of an illustrative E-TES system employing conductive firebricks in accordance with described embodiments;

DETAILED DESCRIPTION

One or more embodiments described herein provide systems and methods for performing electrically heated thermal energy storage (E-TES). Such systems and methods may be useful for decarbonization for various applications, including, but not limited to, those relating to power grid or industrial systems. As increasing numbers of renewable energy generators are deployed into the power grid, it is desirable for abundant and affordable energy storage technologies to cover cycles in power generation, for example, in solar or wind energy generation. The E-TES embodiments described herein may satisfy these goals. Moreover, these and/or other embodiments may be used in various industrial processes that generate and/or consume heat, such as furnaces, kilns, refineries, nuclear power plants, and so on. As described herein, some embodiments of E-TES may employ electrically heated firebricks to store heat energy for use as heat or conversion to electricity.

Figure 1:
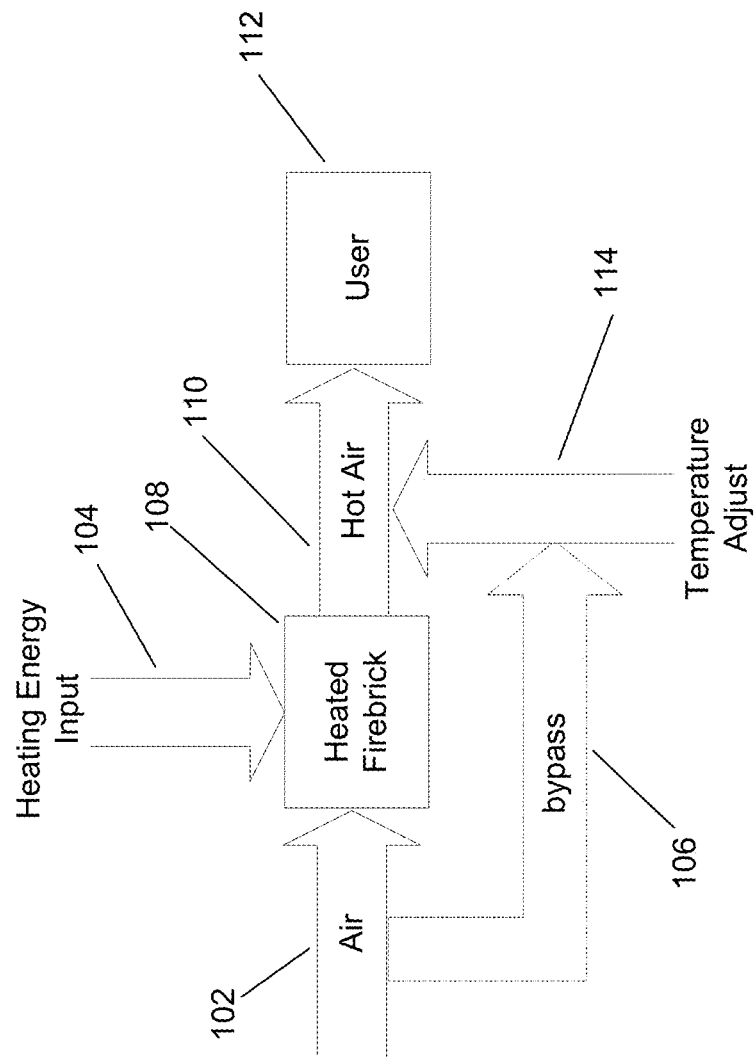
FIG. 1 is a block diagram of an illustrative industrial system employing a conductive firebrick system in accordance with described embodiments.

FIG. 1 shows an embodiment of an illustrative deployment of an E-TES system employing heated firebricks in a power grid or industrial system. As shown in FIG. 1, heated firebrick E-TES system 108 may receive electricity input 104 to heat the firebricks, and may also receive air input 102. For example, air input 102 may be of "cold" air, ambient temperature air, exhaust air from an industrial process, and so forth. The input air is heated by the heated firebrick 108, and may be output as hot air 110. In some embodiments, the temperature of output hot air 110 may be adjusted by temperature adjustment 114, which may include air provided by air bypass 106 from input air 102. For example, the temperature of the output air might be adjusted by providing cooler air (e.g., via bypass 106) if the temperature of heated firebricks 108 is greater than the temperature desired for output hot air 110 provided to output user 112, which may be, for example, a kiln or furnace. Alternatively, if the temperature of heated firebricks 108 is less than the desired temperature for output air 110, additional fuel, such as natural gas, might be provided via temperature adjustment 114 to increase the temperature of output hot air 110.

In some embodiments, output user 112 may be a natural gas power cycle plant. In accordance with one or more embodiments, a predetermined efficiency may be achieved, e.g., a roundtrip electrical efficiency of 55-60%. In other embodiments, output user 112 may be a nuclear power plant (e.g., a generation IV nuclear reactor), and the E-TES system may achieve, for example, a roundtrip electrical efficiency of 65-70%. In one embodiment, the E-TES system (e.g., firebricks 108) may be collocated proximately with the user 112.

However, existing systems do not achieve high enough temperature ranges and/or suffer dramatically short lifetimes due to high temperature required. For example, existing heaters provide limited temperature ranges (e.g., Tpeak of the heater<Tpeak of the firebricks), limited charge rates (e.g., limited ability to transfer heat from the heater to the firebrick due to surface wattage loading of the heaters and/or temperature gradients and thermal stresses of the firebrick), and heater lifetimes dramatically shortened by high temperature, which may incur high replacement costs.

Thus, one or more embodiments provide direct resistance heating of firebricks 108. For example, one or more embodiments may electrically heat an insulated mass of firebrick to very high temperatures (e.g., ~1000° C. to ~2000° C., although higher temperature ranges are possible). The heat stored in firebricks 108 may be delivered as output air 110 by blowing air through channels in the hot firebricks to deliver the stored heat for industrial heat applications (e.g., kilns, furnaces, refineries) or electricity generation applications (e.g., power plants).

Direct resistance heating (DRH) of firebricks 108 eliminates shortcomings in available heaters, and the temperatures are limited only by the properties of the firebricks, enabling higher temperature applications, increased energy density, and higher charge rates. Further, a firebrick system eliminates wattage loading constraints of existing heaters, and designing the firebricks to provide near-uniform heat generation throughout the firebrick system reduces stress on the system, which, in turn, reduces repair costs and provides for more reliable operation. Thus, in accordance with one or more embodiments, electrically conductive bricks are provided that can be mass produced to form a stable stackable electrical circuit for joule-heating that can be cycled daily from in a predetermined range (e.g., approximately 1000° C. to approximately 1800° C., or another range) for long periods of time, e.g., many years.

Described embodiments provide firebricks made of suitable material to have electrical conductivity to provide desired heating characteristics. A gradual resistivity-temperature trend dominated by carrier mobility may be a property of the firebricks.

Figure 2B:
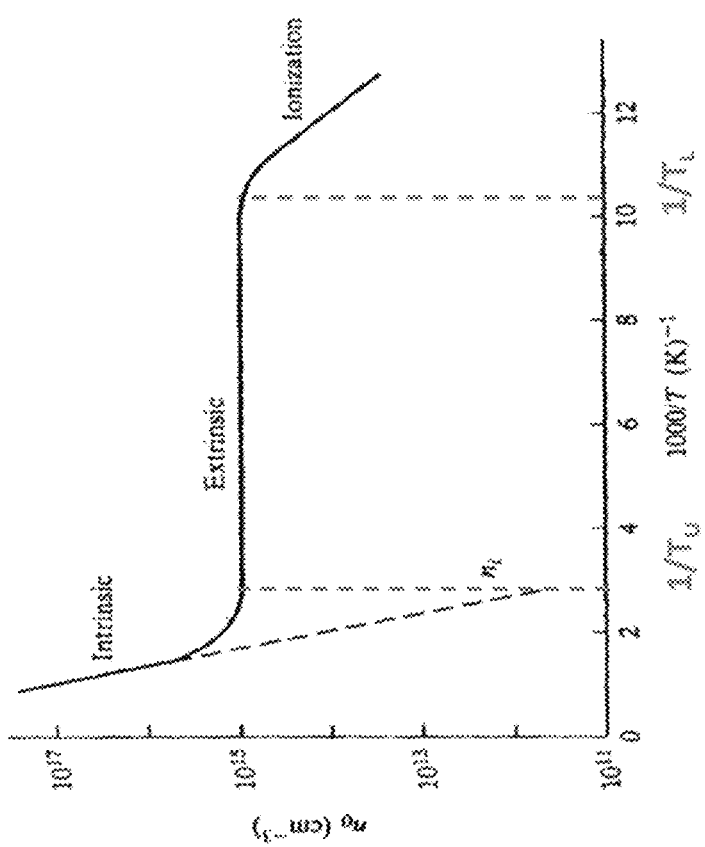
FIG. 2B is a plot of electron concentration over temperature for doped semiconductor firebricks in accordance with described embodiments.
Figure 2A:
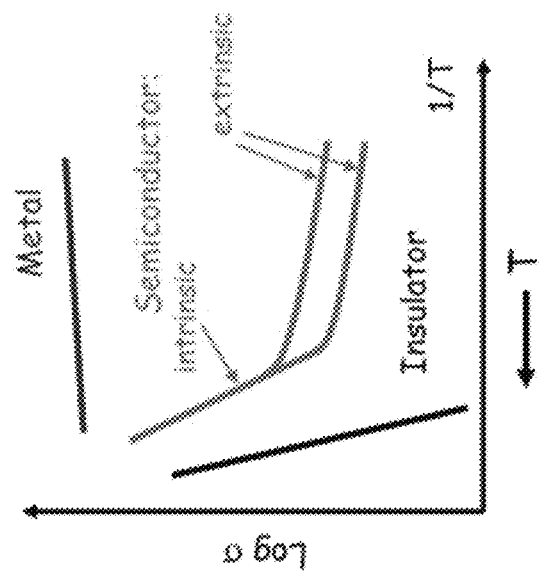
FIG. 2A is a plot of material conductivity over temperature for firebricks of various materials in accordance with described embodiments.

FIG. 2A shows a plot providing examples of the conductivities of different materials over temperature. The electrical conductivity of a material may be determined, for example, by Equation (1):

$$\sigma = q^* \mu_c(T) N_c(T), \quad (1)$$

where T is temperature, q is carrier charge, $\mu_c$ is carrier mobility, and $N_c$ is carrier number density.

Carrier mobility, μc, may be estimated based on Equation (2):

$$\mu_c(T) \propto T^{3/2} \text{ or } \mu_c(T) \propto T^{3/2} \exp\left(-\frac{E_h}{kT}\right) \quad (2)$$

where $E_h$ is the free charge "hopping" energy and k is the Boltzmann constant. The hopping energy relates to extra energy for free charges to move in some lattices, and $E_h$ depends on the type of material (zero for metals). The $T^{-3/2}$ term represents a slowing mobility due to greater carrier interactions with lattice vibrations. In some cases, the "hopping" term may dominate and create a sharp increase in mobility at relatively lower temperatures. At most relevant temperatures (e.g., ones in a predetermined range), the "hopping" term levels off and the shrinking $T^{-3/2}$ term becomes the dominant behavior. The mobility $\mu_c(T)$ may have a gradually decreasing or increasing trend with temperature and may be the standard in most heating devices. Here, the exponent and the temperature dependence of the carrier density $N_c(T)$ change based on the material, and lattice vibrations may generally increase with temperature, which reduces carrier mobility.

As shown in FIG. 2A, in metals, electrons have a continuum of allowable energies (e.g., $N_c \approx$ constant), such that heating is generally stable, and any uneven heating is corrected by a lowering of conductivity in hotter areas, and colder areas have higher current than warmer areas. Thus, the electrical conductivity can be estimated as $\sigma \propto T-3/2$.

In semiconductor firebricks, the semiconductor intrinsic conductivity has a band gap between a conduction band and a valence band, such that electrons are localized and cannot jump levels without thermal activation. Thus, the intrinsic conductivity can be estimated as $$\sigma \propto \exp\left(-\frac{E_g}{2kT}\right),$$

where Eg is the semiconductor bandgap energy.

In the case of semiconductor extrinsic conductivity, when the semiconductor is doped with an element having one more or one less valence electron than the replaced element, an electron donor or acceptor site may be formed. The activation energy, Ea, associated with "donating" or "accepting" an electron, may be less than the semiconductor bandgap energy Eg. Thus, the intrinsic conductivity can be estimated as $\sigma \propto$ $$(T-3/2)\exp\left(-\frac{E_a}{kT}\right).$$

The exponential conductivity trends of semiconductors cause a hot location to receive even more current, which could cause a short-circuit condition in the remainder of the firebrick stack.

Figure 2C:
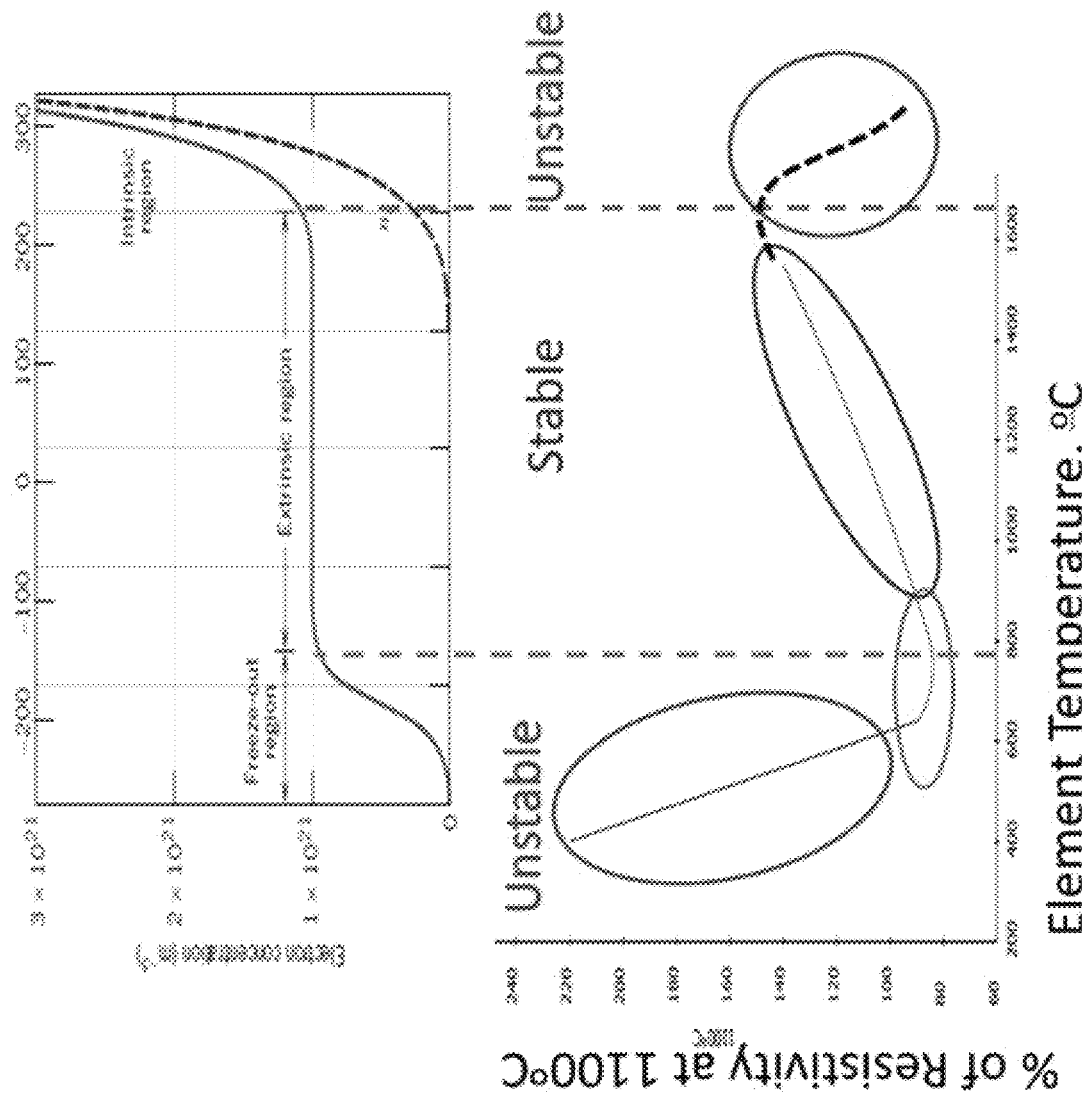
FIG. 2C are a series of plots of electron concentration and resistivity over temperature for doped semiconductor firebricks in accordance with described embodiments.

Therefore, in accordance with one or more embodiments, "metallic" behavior may be achieved in a high temperature ceramic in a highly oxidizing environment. Doping a semiconductor material to achieve a period of "exhaustion" before the exponential trend takes over allows for three distinct conductivity regions to form: intrinsic, extrinsic (or "exhaustion"), and ionization (or "freeze-out"), such as shown in the plot in FIG. 2B. As shown in FIG. 2B, in the extrinsic region, Nc(T) is constant, thus exhibiting performance like a metal. As shown in FIG. 2C, in the unstable region, extrinsic carriers are activated $$\left(\sigma \propto \exp\left(-\frac{E_a}{2kT}\right)\right),$$

with carrier activation leveling off as all the carriers are activated, leading to decreasing mobility and increasingly metal-like behavior, where conductivity is constant over temperature (e.g., $\sigma \propto T-3/2$). As temperature continues to increase, intrinsic carriers are activated, eventually overtaking the extrinsic carriers, and the unstable region is entered $$\left(\sigma \propto \exp\left(-\frac{E_g}{2kT}\right)\right).$$

FIGS. 2B and 2C show examples where upper and lower temperature bounds, TU and TL, can be selected by modifying the material and dopant level, to thus set a desired temperature range of operation where conductivity of the firebrick material is approximately constant (e.g., the exhaustion region). The temperatures TU and TL depend on the semiconductor bandgap energy Eg, which is the band gap energy (eV) inherent to the firebrick bulk material, Ea, which is the activation energy (eV) of the dopant site by interaction between the dopant material and the bulk material, and Na, which is the density (per $cm^3$) of the dopant material added. In general, exhaustion regions shift to higher temperatures as doping is increased.

FIG. 2C shows a doped SiC ceramic heater, also a common firebrick material, for which TL is approximately 800° C. and TU is approximately 1600° C. Doped SiC is not generally suitable for E-TES due to oxidation, which prevents flow of electricity between firebricks, and eventually destroys the bulk properties of the material.

Thus, in accordance with one or more embodiments, a firebrick bulk material based on metal oxides, such as chromium oxide ($Cr_2O_3$), may be selected with a given semiconductor bandgap energy Eg. A dopant material with a relatively low Ea may be used to dope to an Na to achieve the desired temperature range TL to TU. The goals of the selections are to achieve low TL (~700° C. or less), high TU (~1800° C. or more), a large temperature range (e.g., exhaustion range of ~1000° C. or more), and high Na (e.g., heavily doped) so that impurities can be ignored (~1020/ cm3 or more).

FIG. 2D shows an example where a stable, stackable semiconductor firebrick may be provided in accordance with one or more embodiments, which firebrick may achieve metallic conductivity behavior for use in electrically-heated thermal energy storage (E-TES) systems. As shown in FIG. 2D, E-TES system 200 might include a "top" electrode 202 and a "bottom" electrode 204. Between electrodes 202 and 204 is a layer of firebricks, shown as firebrick layer 206. Firebrick layer 206 includes a plurality of stackable firebricks 208, which, for example, may be on different levels in overlapping relationship with one another. In another embodiment, the firebricks 208 may all be on the same level. The plurality of stackable firebricks 208 may form air channels 210 between adjacent pairs of the individual firebricks, since firebricks 208 are freely stacked (this also allows thermal expansion of the firebricks). In general, air flow may be in at least one predetermined direction. An example of the direction is indicated by dashed line 212.

FIG. 3 shows a diagram of an illustrative regenerator vessel that may be used to contain a firebrick E-TES system such as shown in FIG. 2D. As shown in FIG. 3, vessel system 300 may include air inlet 310, lower plenum 308, body 312, upper plenum 304, and hot air outlet 302. Collectively, plenums 304 and 308 and body 312 may form vessel 314. In general, vessel 314 may be an insulated steel vessel that is collocated at an industrial facility or power plant. In some embodiments having higher air pressures, vessel 314 may be prestressed concrete. As shown, vessel 314 might contain a predetermined pattern (e.g., a checkerwork) of firebricks, shown generally as firebricks 306, and which may be implemented such as described in regard to FIG. 2D.

As shown, lower plenum 308 is a hemispherical entrance of an airstream into vessel 314, and upper plenum 304 is a hemispherical exit of an airstream through vessel 314. The air stream is provided from inlet 310 and flows through firebricks 306 as indicated by dashed arrow 316 and which then exits through hot air outlet 302. In some embodiments, lower plenum 308 includes support structures for vessel 314 (e.g. corrosion-resistant steel, ceramic archways or dome structure, etc.) to support vessel 314 as a standing structure. Additionally, in some embodiments, lower plenum 308 may be maintained at a lower temperature than the rest of vessel 314 by employing an insulation layer between lower plenum 308 and the firebrick checkerwork 306, and/or by employing one or both of passive and active cooling. Although shown in FIG. 3 as being generally cylindrical, vessel 314 by have a specific size and shape that varies based on its use and application.

As will be described, vessel 314 might have a large input of electricity (e.g., as 3-phase AC power or as DC power), and in one embodiment the firebrick checkerwork 306 may be implemented to have three isolated electrically conductive firebrick sections in a predetermined configuration. Examples include a delta configuration, a wye configuration, or another configuration. In one embodiment, the 3-phase power may be provided by electrical penetrations to the firebrick checkerwork and/or conductive electrodes that survive high temperature oxidizing environments.

FIG. 4 shows an embodiment of firebrick checkerwork 306 that may be included in the regenerator vessel of FIG. 3. As shown in FIG. 4, firebrick checkerwork 306 may include a plurality of layers or sections of chimney-style checker firebrick having different conductivities and/or functions.

As shown in FIG. 4, an illustrative embodiment may employ three general types of firebricks: insulating firebricks 402, 410, 412, and 414, electrode firebricks 404 and 408, and conductive firebricks 406. The insulating firebricks are electrically insulating, and may be implemented using a predetermined combination of materials. An example combination is alumina/magnesia/silica. The electrode firebricks are highly doped ($\sim 10^{21}/cm^3$) metal oxide firebricks that are highly conductive and provide low heat generation (e.g., electrode firebricks do not need a small resistance-temperature coefficient). The conductive firebricks are carefully blended and doped ($\sim 10^{20}/cm^3$) metal oxide firebricks that are approximately a factor 10 more resistive than the electrode firebricks and have a small resistance-temperature coefficient.

As shown in FIG. 4, a top layer of insulating firebricks, shown as top insulation layer 402, electrically insulates top electrode 404 from the structure of vessel 314, and provides thermal mass and weight for good electrical contact between top electrode 404 and conductive firebrick checkerwork 406. In some embodiments, top electrode 404 may be made of multiple sections of electrode firebrick, shown as electrode sections 404a-n. In some embodiments, there may be three electrode sections of top electrode 404, for example to isolate the individual phases of a 3-phase power input. Each of the electrode sections 404a-n may be separated by one or more sections of insulating firebricks, shown as insulating section 414. A different number of sections may be included in another embodiment.

Conductive firebrick checkerwork 406 might also include multiple sections of conductive firebrick, shown as conductive sections 406a-n, which in some embodiments may generally align with and correspond to electrode sections 404a-n for 3-phase power. Conductive firebrick checkerwork 406 is the site of heat generation and storage in the E-TES system. Bottom electrode 408 is also made of electrode firebricks. In embodiments employing wye configuration 3-phase power, bottom electrode 408 is a single section, forming the neutral point of contact for the 3-phase wye configuration, as shown in FIG. 4. In embodiments employing delta configuration 3-phase power, bottom electrode 408 may be separated into multiple conductive sections to route electricity through checkerwork 406 to provide the impedance loading between phases. Bottom insulation layer 410 is made from insulating firebricks and electrically and thermally insulates bottom electrode 408 from vessel 314. A different number of conductive sections may be included in another embodiment.

Figure 5:
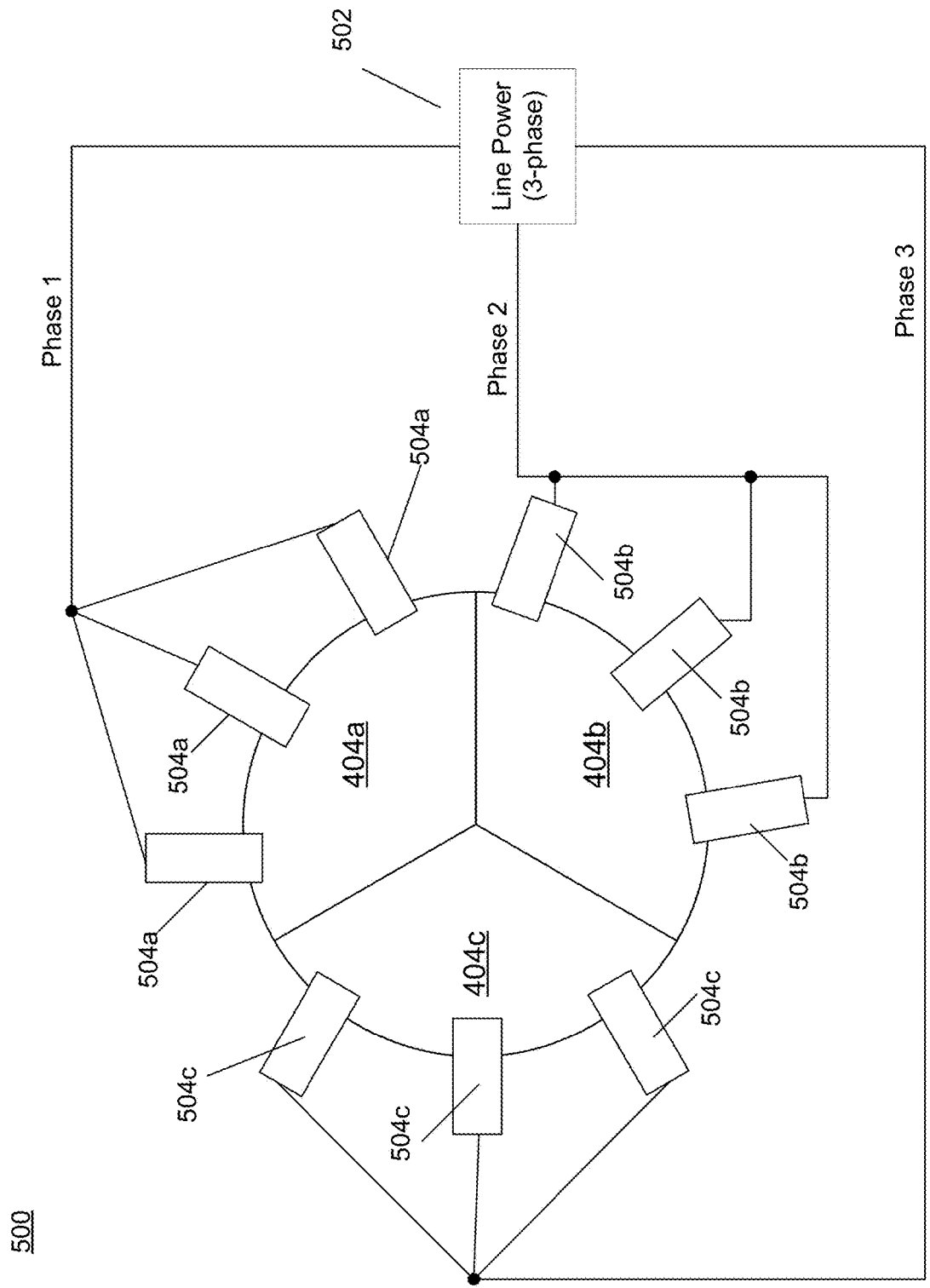
FIG. 5 is a schematic diagram of an illustrative wye configuration electrical connection of an electrode of an E-TES system in accordance with described embodiments.

FIG. 5 shows an embodiment of an E-TES system 500 employing wye configuration 3-phase power allows vessel penetrations for electrodes to be at the top of vessel 314, for example, by only introducing electricity at the top electrode 404. As shown, line source 502 generates three phase electricity, and a single phase is provided to a corresponding one of top electrode sections 404a-c. As shown in FIG. 5, each electrode section 404a-c may have one or more electrical penetrations of vessel 314, shown as electrical connections 504. The illustrative embodiment shown in FIG. 5 may include electrical connections 504 only at the top of vessel 314. For example, in embodiments with only power connections at the top of vessel 314 at top electrode 404, maintenance or replacement of components may be easier by removing only top insulation layer 402. Other embodiments may additionally or alternatively employ connections at the bottom of vessel 314, which may be more difficult to access for maintenance, but may benefit from cooler temperatures due to air flows through the E-TES system. In some embodiments, the electrical penetrations 504 may be temperature and/or pressure-controlled, for example by annular vessel sleeves, to maintain reliable ceramic/metallic interfaces between the electrical penetrations 504 and the electrode firebrick sections 406.

Figure 6:
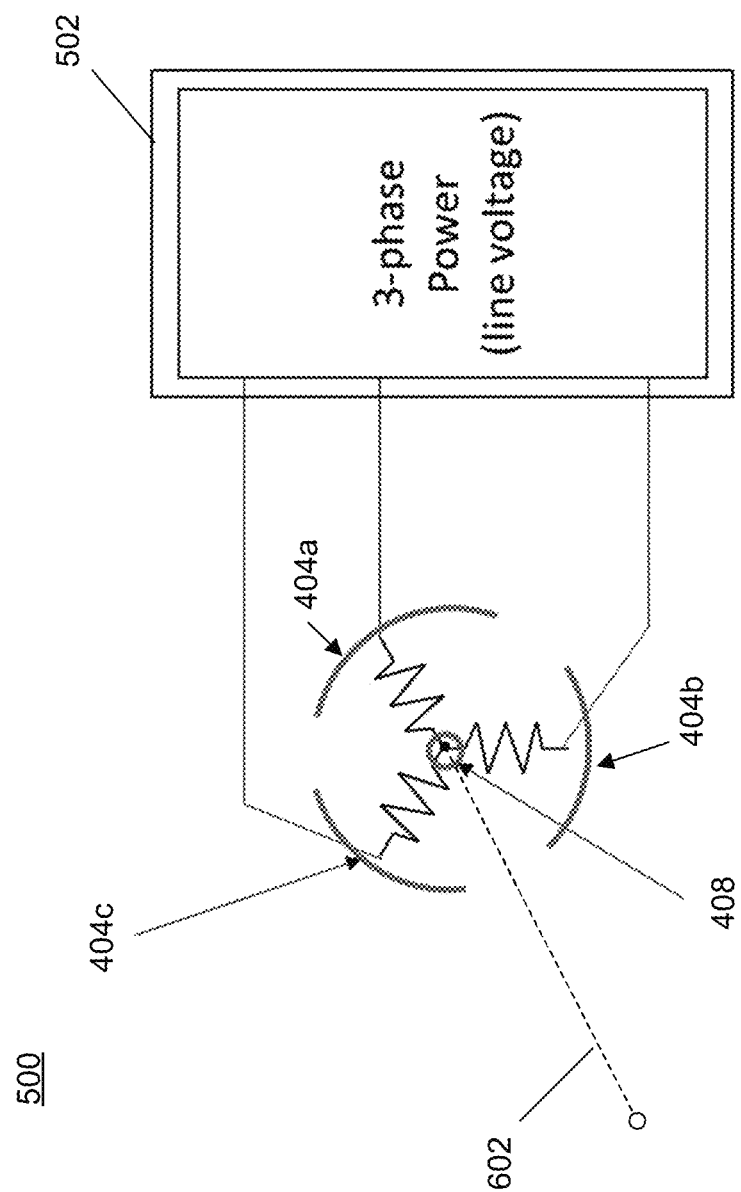
FIG. 6 is a schematic diagram of an illustrative wye configuration electrical connection of an electrode of an E-TES system in accordance with described embodiments.

FIG. 6 shows an illustrative electrical schematic diagram of an embodiment of the wye configuration of E-TES system 500. In this embodiment, each section of top electrode 404 corresponds to a given phase supplied from power generator 502, and bottom electrode 408 may be employed to provide a neutral point, optionally having a neutral connection 602.

As described herein, embodiments provide electrically conductive firebrick made from doped metal oxide. The doped metal oxide firebricks provide high temperature operating ranges (1800° C.), are electrically conductive, are electrically stable (exhibiting near constant resistivity above 400° C.), are thermally cyclable over many cycles, are physically stackable with low contact resistance (on the order of 0.1 Ω-cm2 at 5 PSI), and are inexpensive.

Figure 7A:
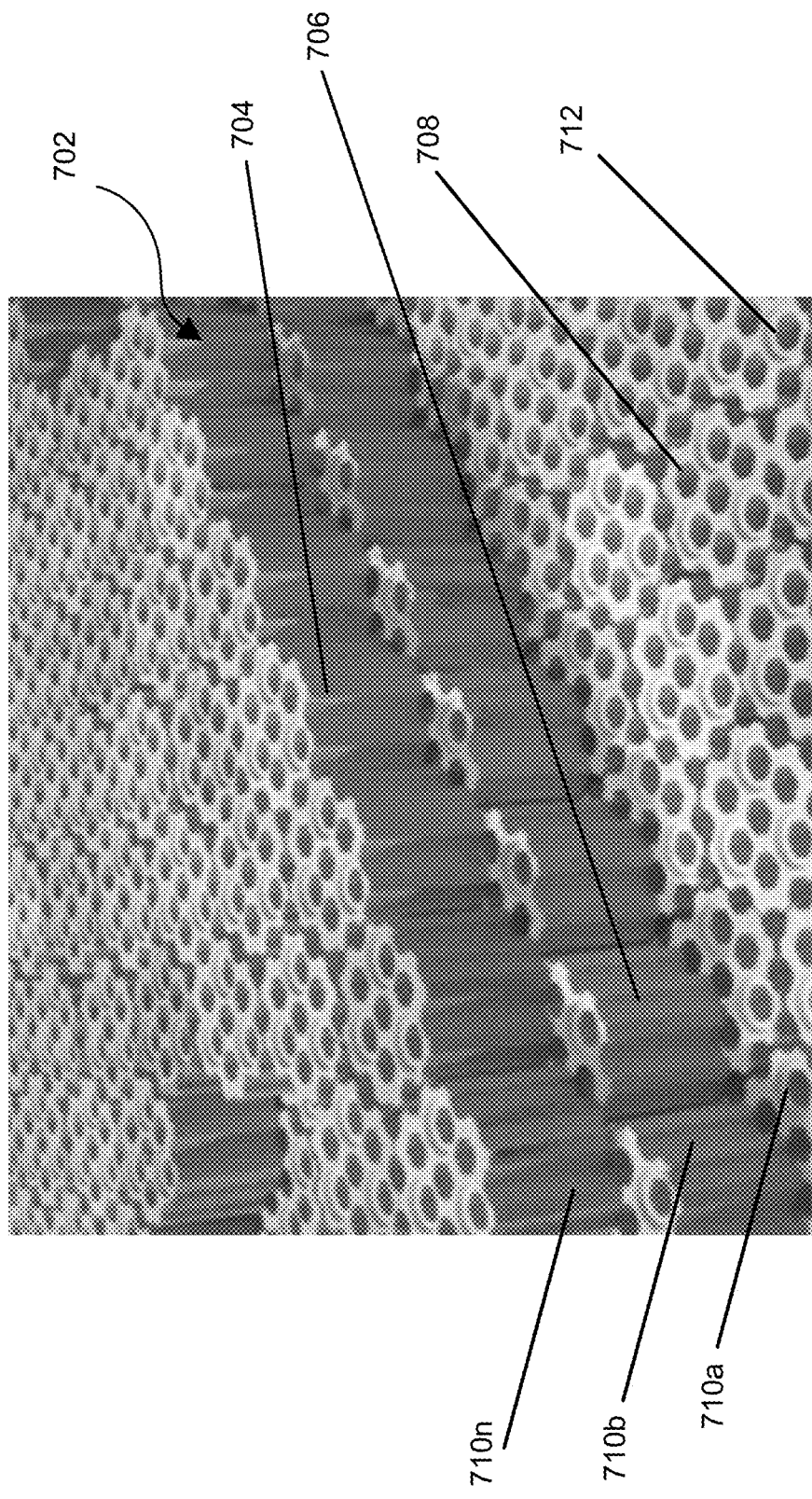
FIG. 7A is an image of an illustrative firebrick system in accordance with described embodiments.

FIG. 7A shows an illustrative embodiment of firebrick checkerwork 700. Checkerwork 700 may include a plurality of layers (or levels) of firebricks 702 stacked atop one another, shown as layers 710a-n. As shown, each firebrick 702 may be implemented as a chimney-style brick, having one or more chimney vents 708 through the firebrick along an axis of the firebrick (e.g., vertically from bottom to top).

For example, as shown, each firebrick 702 includes seven chimney vents 708, each of which are generally hexagonal in cross-sectional shape. The overall shape of each firebrick 702 is selected to be generally symmetric to allow easy stacking and arranging within a checkerwork including a plurality of firebricks, and also to allow ease of manufacturing. For example, as shown in FIG. 7, firebrick 702 may also be generally hexagonal and may include one or more ridges 706 and/or teeth 704 around the outer edge or circumference of the firebrick. The outer ridges and teeth may facilitate arranging multiple firebricks into a checkerwork and to facilitate interlocking between firebricks. Further, the shape of firebricks 702 and the ridges 706 and teeth 704 may facilitate deploying firebricks 702 in vessels of differing shapes without altering the firebricks (e.g., vessel 314 of FIG. 3). Similarly one side (e.g., the top) of each firebrick 702 may include a depression 712, and the other side (e.g., bottom) may have a corresponding protrusion (not shown) to fit within the depression, further facilitating stacking and interlocking the firebricks.

Figure 7B:
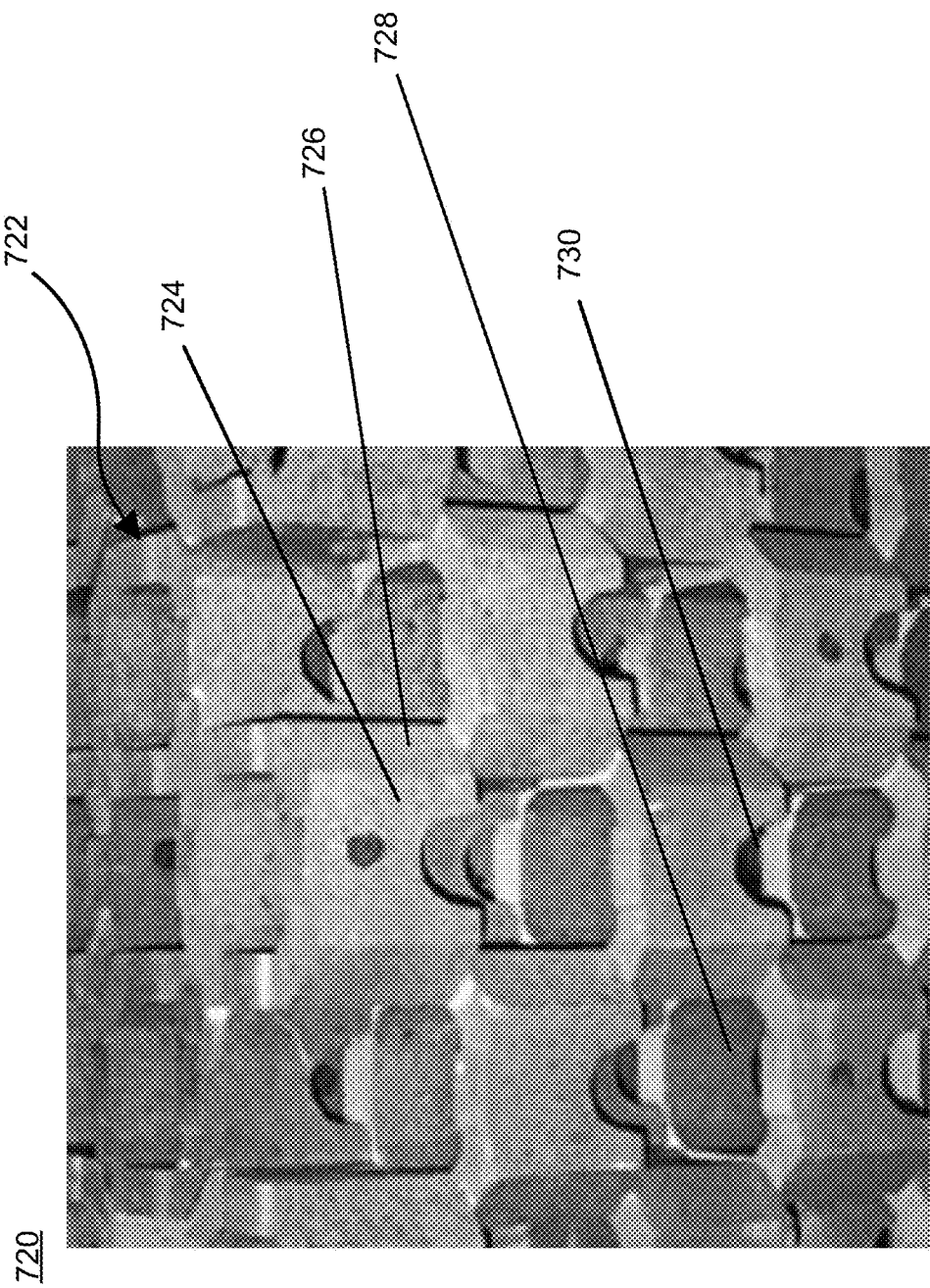
FIG. 7B is an image of an illustrative firebrick system in accordance with described embodiments.

FIG. 7B shows another illustrative embodiment of firebrick checkerwork, shown as firebrick checkerwork 720. As shown, each firebrick 722 may include one or more chimney vents 728. As shown, each chimney vent may be generally square in cross section and run through the firebrick along an axis of the firebrick (e.g., vertically from bottom to top). Edges of each firebrick 722 may be sloped or rounded to facilitate arrangement within a checkerwork and/or deployment within vessels of different shapes, shown as edges 724 and 726. Some embodiments may include one or more side notches 730 to facilitate interlocking between firebricks.

The firebrick embodiments shown in FIGS. 7A and 7B may allow the bricks to expand and contract as temperatures change, does not require any materials between the firebricks that might be damaged by the expansion and contraction and/or the extreme temperatures, and the deformability allows the conductive firebricks to maintain good electrical connections as the materials deform over temperature changes.

Thus, the described firebricks are made by mixing a powder form of the bulk material (e.g., chromium oxide) with a desired amount of dopant material (e.g., nickel oxide). In some embodiments, the dopant material may be between approximately 2% and 5% of the mixture. The mixture is then mechanically pressed into a brick having a desired size, shape, and form factor, and including one or more chimney vents to allow airflow through the firebrick. The firebrick is then temperature/pressure sintered into a brick.

In described embodiments, the firebricks may be chromium oxide doped with nickel, chromium oxide doped with magnesium, nickel oxide doped with lithium, nickel oxide doped with copper, zinc oxide doped with aluminum, stabilized zirconium oxide doped with cerium, titanium oxide doped with niobium, or other high temperature metal oxides doped with metals of a different valency, which may also be blended with electrically inactive oxides such as alumina, magnesia, or silica. For example, in some embodiments, some alumina (e.g., aluminum oxide) may be blended in with chromia (e.g., chromium oxide) doped with nickel, which could make the firebrick cheaper and/or stronger, without significantly altering the electrical properties of the firebrick.

Figure 8A:
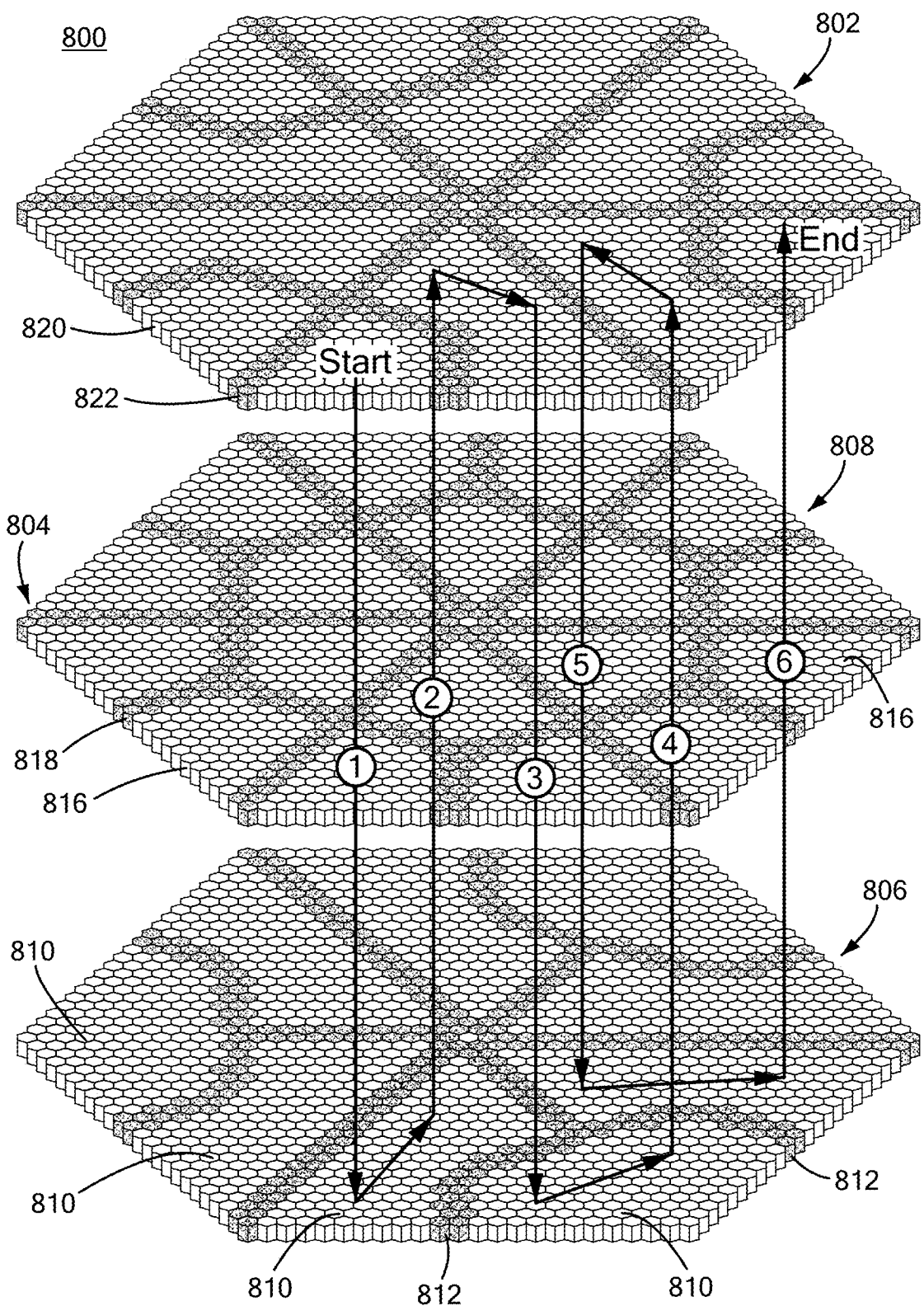
FIG. 8A is a perspective view of an illustrative electrode and conductive firebrick layout for an E-TES system in a delta configuration in accordance with described embodiments.

FIG. 8A shows an illustrative embodiment of a firebrick system 800, which may be an implementation of the system shown in FIG. 4. As shown, top electrode 802 may include one or more insulating sections 822 such that insulating sections 822 divide top electrode 802 into a plurality of conductive sections 820. Similarly, firebrick checkerwork portion 804 may also include one or more insulating sections 818 such that insulating sections 818 divide firebrick checkerwork 804 into a plurality of conductive sections 816. Bottom electrode 806 may also include one or more insulating sections 812 such that insulating sections 812 divide bottom electrode 806 into a plurality of conductive sections 810. As described herein, each of top electrode 802, bottom electrode 806, and firebrick checkerwork 804 may include multiple layers of firebricks, where the insulating sections and conductive sections of each layer overlap and generally align with one another such that the multiple layers form a multi-layer whole. Thus, each of top electrode 802, bottom electrode 806, and firebrick checkerwork 804 may have a plurality of multi-firebrick layer electrically isolated portions.

In some embodiments, the geometry of conductive portions 820, 816, and 810 may be arranged such that various of the conductive portions overlap each other, thereby forming electrical connections and forming a path for electricity to be conducted through the firebrick system 800. For example, as shown in FIG. 8A, line 808 indicates an illustrative electrical path of system 800 based on the arranged overlap of conductive portions 820, 816, and 810.

Thus, one or more embodiments provide electrically conductive firebricks that can form an air-stable and stackable conductive medium, and the manner of stacking the firebricks can form a desired electrical flow path through the overall system 800. As described herein, the firebrick checkerwork 804 is the site of heat generation. In general, firebrick checkerwork 804 and top electrode 802 may be divided into a plurality (e.g., three) electrically isolated phase portions to receive each phase of 3-phase power. Further, each phase portion may be partitioned further to form a "snaking" electrical path, 808, to achieve a desired system resistance and charge behavior and to ensure passive charge stability of system 800. For convenience, line 808 indicates an electrical path for a single electrical phase of system 800, and electrical paths for the other phases may have a similar configuration.

As shown, conductive firebricks are separated by insulating firebricks to form a snaking electrical path indicated by line 808 through the top electrode 802, the firebrick checkerwork 804, and bottom electrode 806. The top electrode 802 and bottom electrode 806 are partitioned by insulating firebricks in a different pattern than firebrick checkerwork 804, but the patters may overlap each other to connect vertical electrical paths as shown by line 808.

Figure 8B:
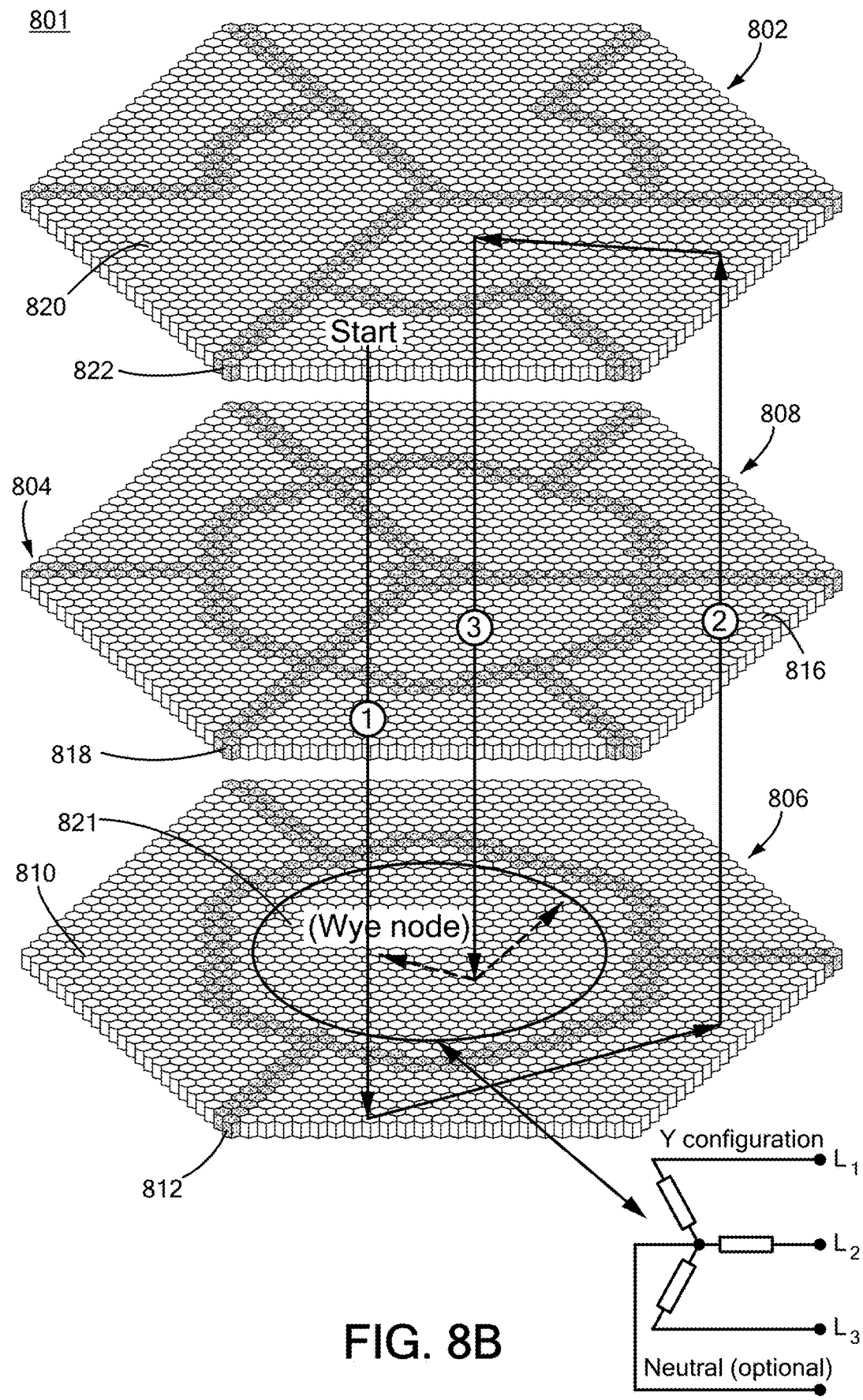
FIG. 8B is a perspective view of an illustrative electrode and conductive firebrick layout for an E-TES system in a wye configuration in accordance with described embodiments.
Figure 8C:
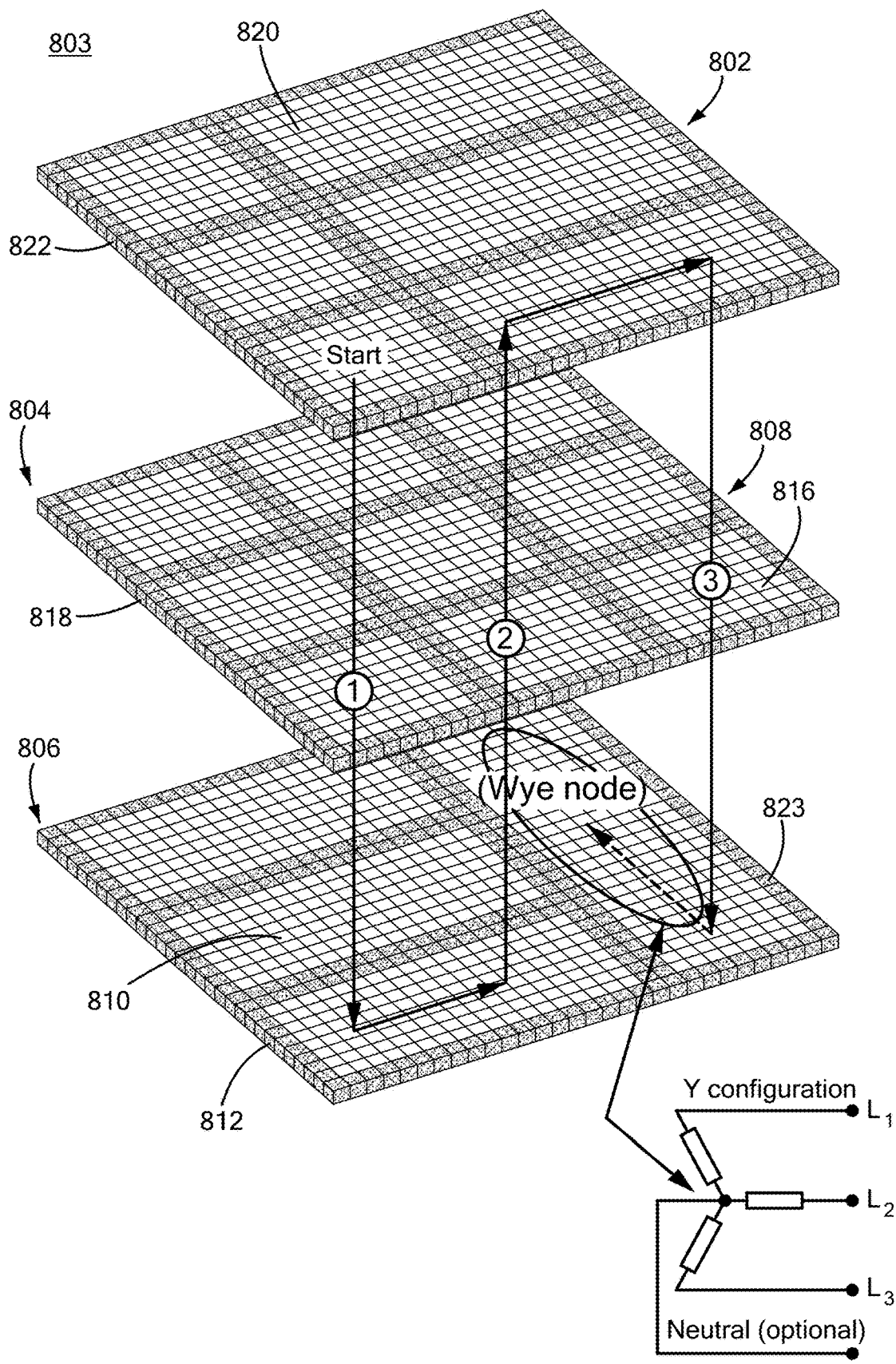
FIG. 8C is a perspective view of another illustrative electrode and conductive firebrick layout for an E-TES system in a wye configuration in accordance with described embodiments.

In some embodiments, the "start" and "end" of electrical path 808 are both at the top electrode 802, thus avoiding having to provide any electrical penetrations at the bottom of the vessel, for example as described in regard to FIG. 5. However, as described herein, other embodiments may alternatively or additionally employ electrical penetrations at the bottom of the vessel. For example, the checkerwork pattern of the illustrative embodiments described herein (e.g., as shown in FIGS. 8A, 8B, and 8C) may be inverted if it is desirable to have the power connections located on the bottom rather than the top of the vessel.

As shown in FIG. 8A, the electrical system is operating in a delta configuration. The number of snaking paths desired in system, so that the electrical penetrations are on top of the system, will determine the operating configuration. When the number of snaking paths is an even number, the system has a delta configuration, and when the number of snaking paths is an odd number, the system has a wye configuration.

FIG. 8A shows an illustrative "six pass delta configuration" system. Further, although generally described herein as employing 3-phase AC power, some embodiments my employ DC power, for example when powered by a DC electrical source such as a solar panel array or a rectifier. As noted above, electrical path 808 is a snaking electrical path for a single phase of a 3-phase system and, thus, a 3-phase system would employ three separate electrical paths. In a DC system, the same snaking configuration of electrical path 808 used in a delta configuration may be used, but the three electrical paths of the 3-phase system are instead connected in series between the two nodes of the DC power source.

In accordance with one or more embodiments, the widths of insulating sections 822, 818, and 812 are a minimum of two firebricks to maintain isolation in a staggered pattern, but other embodiments may include wider insulation sections. As shown in FIG. 8A, the conductive regions 816 of the firebrick checkerwork 804 are sized to be small enough (in some embodiments, cross sections in the range of 0.25 m to 1.5 m) that electricity and heat are conducted rapidly enough to avoid runaway conditions, and that results in consistency in temperatures throughout firebrick checkerwork 804. In some embodiments, the various conductive regions 816 are approximately similar in size so that electrical flows are symmetric between regions, resulting in more consistent temperature distribution throughout firebrick checkerwork 804. In some embodiments, the height of firebrick checkerwork 804 (e.g., conductive regions 816 and insulating sections 818) is on the range of tens of meters (e.g., commonly 20-40 m).

FIGS. 8B and 8C show illustrative embodiments of electrode and conductive firebrick layouts for E-TES systems in wye configuration. For example, FIG. 8B shows an illustrative firebrick system 801 employing electrical path 808 in a "three pass" wye configuration. Similarly as in FIG. 8A, electrical path 808 represents one of the electrical paths in a 3-phase system. As described herein, in some embodiments, a given electrical path 808 corresponds to one of the phase legs of the 3-phase system, and might start in a given one of conductive regions 820 of top electrode 802. Each electrical path 808 might end at wye node 821, and the electricity flow through the path 808 for one of the legs of the 3-phase system flows back up through the electrical paths for the other legs of the 3-phase system.

Although FIG. 8B shows each snaking path 808 as having the same (or substantially similar) shape, this is not required by the system. In one or more embodiments, an electrical path 808 may be employed having the same (or substantially similar) flow area to avoid bottlenecks in current flow where overheating could occur. As shown in FIGS. 8A and 8B, each layer 802, 804, and 806 of the firebrick system may have a predetermined geometry (e.g., might be generally hexagonal), for example, in order to facilitate fitting within a vessel having a generally circular cross-sectional shape, although other shapes and configurations are possible.

FIG. 8C shows an illustrative firebrick system 803 employing layers 802, 804, and 806 having a substantially square or rectangular cross-sectional shape, which might beneficially be employed in a vessel of the same cross-sectional shape. As shown in FIG. 8C, electrical path 808 in a "three pass" wye configuration. Similarly as in FIG. 8A, electrical path 808 represents one of the electrical paths in a 3-phase system. As described herein, in some embodiments, a given electrical path 808 corresponds to one of the phase legs of the 3-phase system, and might start in a given one of conductive regions 820 of top electrode 802. Each electrical path 808 might end at wye node 821, and the electricity flow through the path 808 for one of the legs of the 3-phase system flows back up through the electrical paths for the other legs of the 3-phase system. Although shown in FIG. 8C as each snaking path 808 having the same (or substantially similar) shape, this is not required by the system. Preferably, described embodiments would employ an electrical path 808 having the same (or substantially similar) surface area (not necessarily shape) such that the current flows are substantially the same in each path, thus avoiding current flow bottlenecks of higher resistance where overheating could occur.

Thus, E-TES firebrick systems as described in accordance with one or more embodiments may achieve heating systems of varying size, shape and temperatures up to a certain limit, e.g., ~2000° C. or another limit in air. The firebrick systems may have a modular design in terms of shape and size and can thus be adapted to a variety of furnace or vessel shapes and sizes. Further, the firebrick systems as described herein may be compatible with standard control systems while achieving temperatures that are hotter than other systems can achieve, while operating with high stability over a longer heater lifetime than other solutions.

Figure 9:
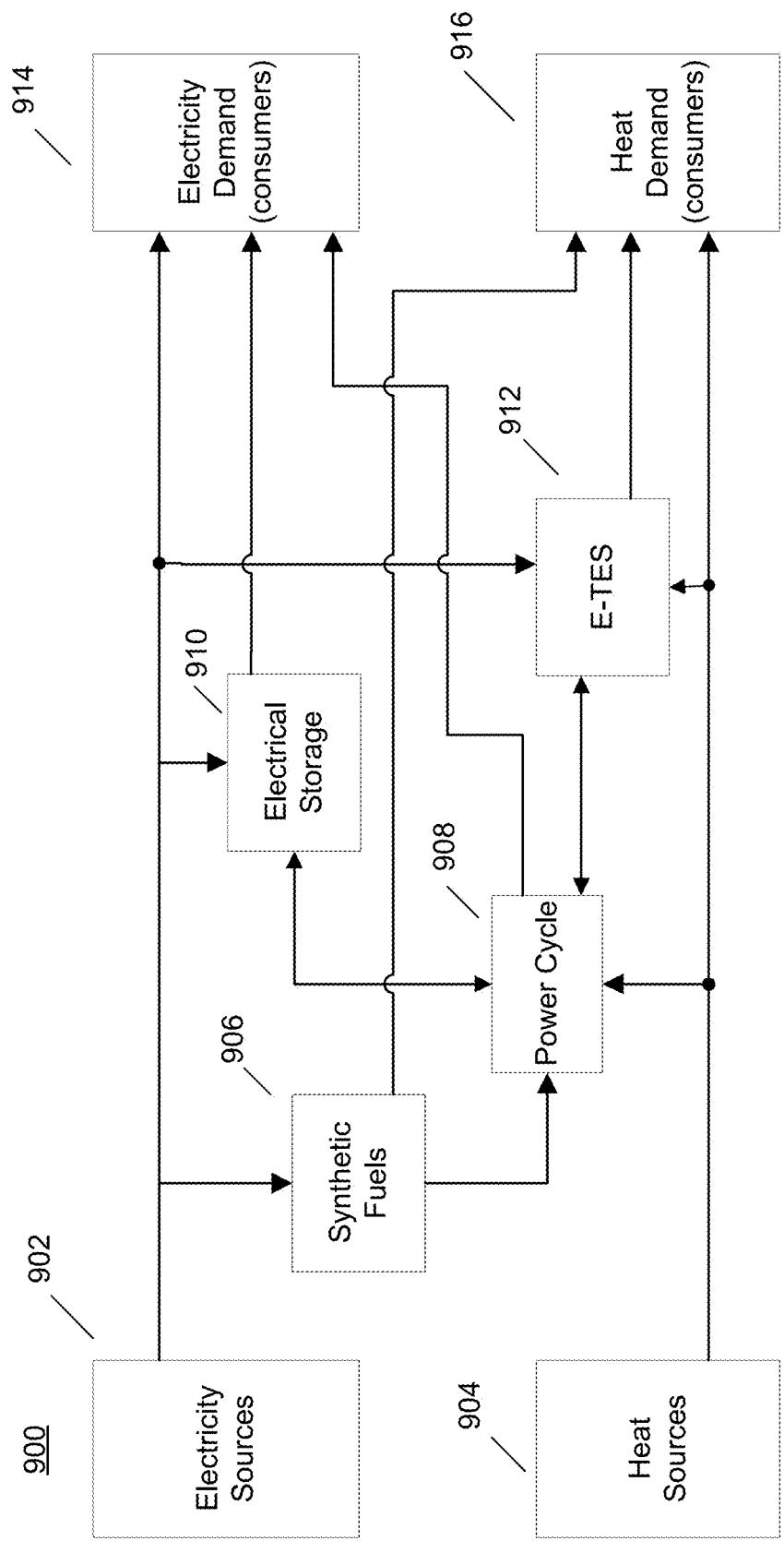
FIG. 9 is a block diagram of an illustrative energy distribution and storage grid employing an E-TES system in accordance with described embodiments.

FIG. 9 shows an illustrative embodiment of an E-TES firebrick system 912 within an example electricity distribution grid 900. As shown in FIG. 9, E-TES system 912 may be used in conjunction with existing power generation and storage technologies (e.g., power generators 902, heat generators 904, synthetic fuel systems 906, power cycle systems 908, and traditional electrical storage systems 910) to store excess electricity as heat and provide the stored energy as either electricity to electricity consumers 914, or as heat to heat consumers 916.

Figure 10:
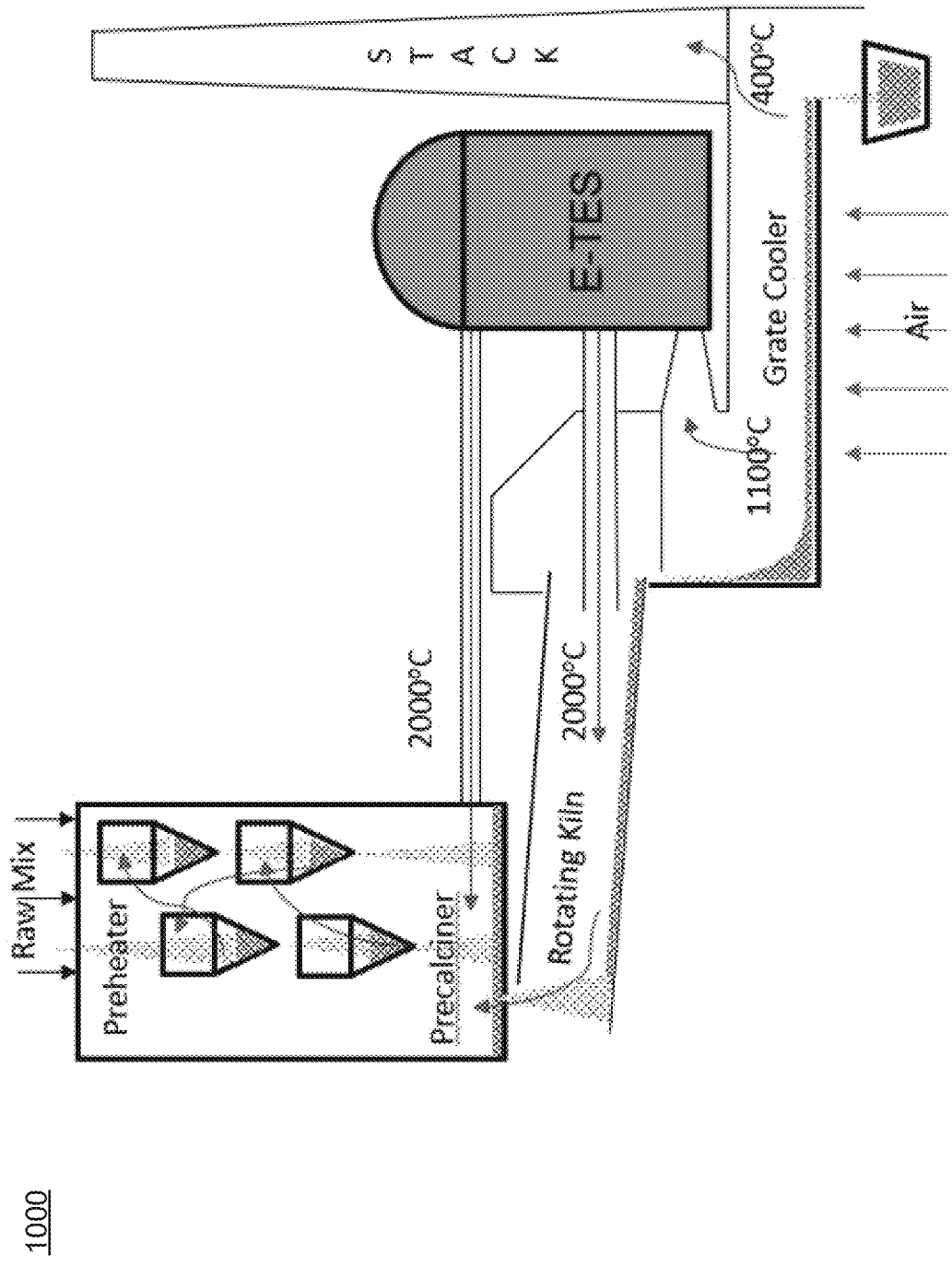
FIG. 10 is a block diagram of an illustrative concrete kiln system employing an E-TES system in accordance with described embodiments.

FIG. 10 shows an embodiment of an E-TES firebrick system as described herein employed, for example, in one or more cement kilns. As shown, the E-TES system might receive cooler air from a grate cooler of the cement plant, and then supply electrically heated air to one or both of the rotating kiln and/or the precalciner. This might result in significant carbon emission reductions for the cement plant, and could also result in large energy cost savings (renewable energy surplus). Reduced use of combustion gases can result in easier calcination of the cement. Finally, E-TES systems are estimated to be very cost effective for cement plants, estimated to be approximately 5% of total cement plant cost.

Figure 11:
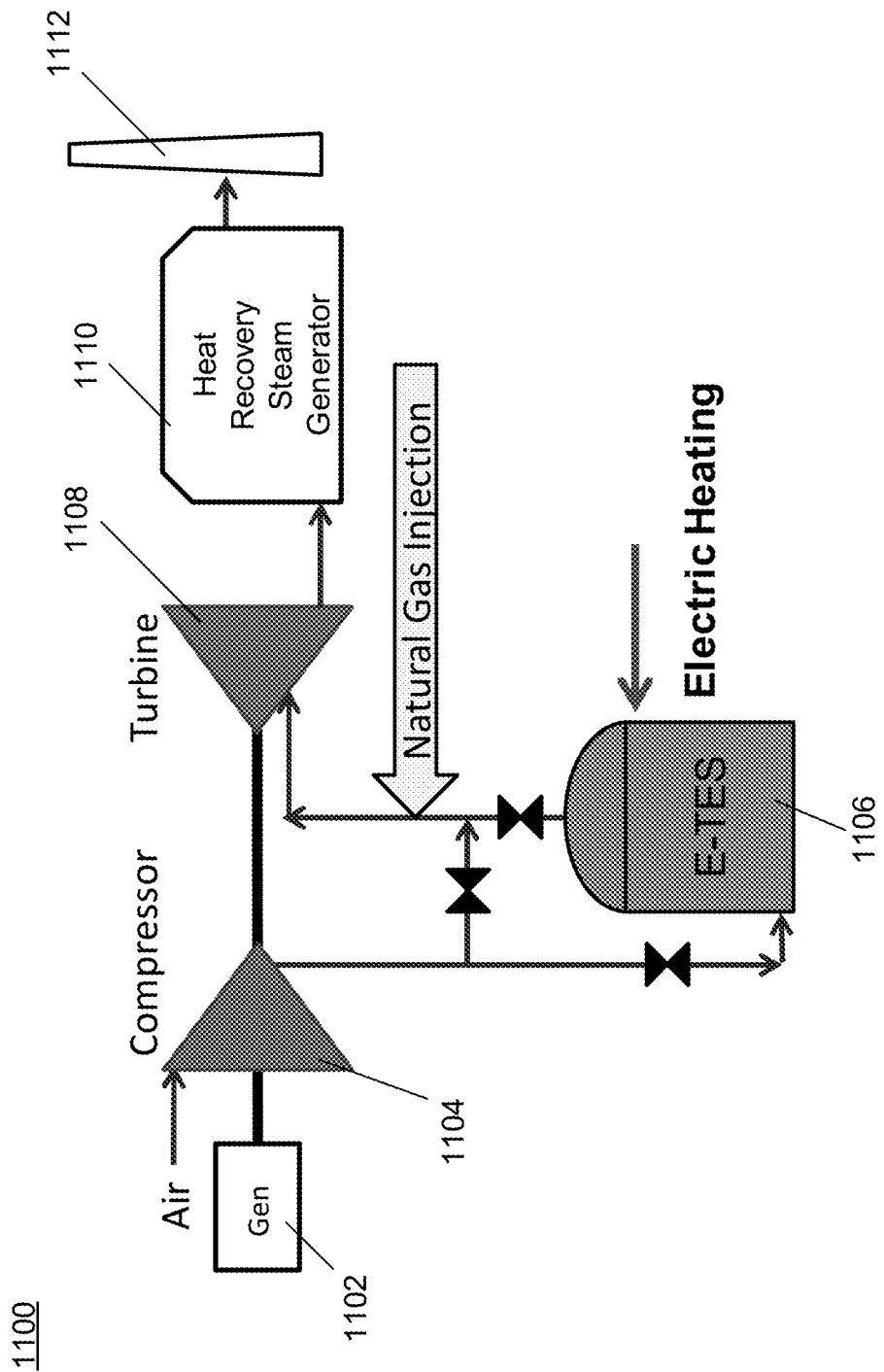
FIG. 11 is a block diagram of an illustrative natural gas power system employing an E-TES system in accordance with described embodiments.

FIG. 11 shows an embodiment of an E-TES system may be employed to act as batteries when coupled to a power plant, which, for example, may be a natural gas power plant, shown as plant 1100. As shown, the E-TES system 1106 may be provided air from compressor 1104. The E-TES system 1106 is heated electrically to provide hot air to turbine 1108, which in turn is provided to a heat recovery steam generator 1110 and stack 1112. The turbine provides power to the compressor 1104 and the generator 1102. In one embodiment, natural gas may be injected to increase the heat to even higher levels. This system may achieve a predetermined efficiency, e.g., a 55-65% round-trip energy efficiency or a different range of efficiency.

Figure 12:
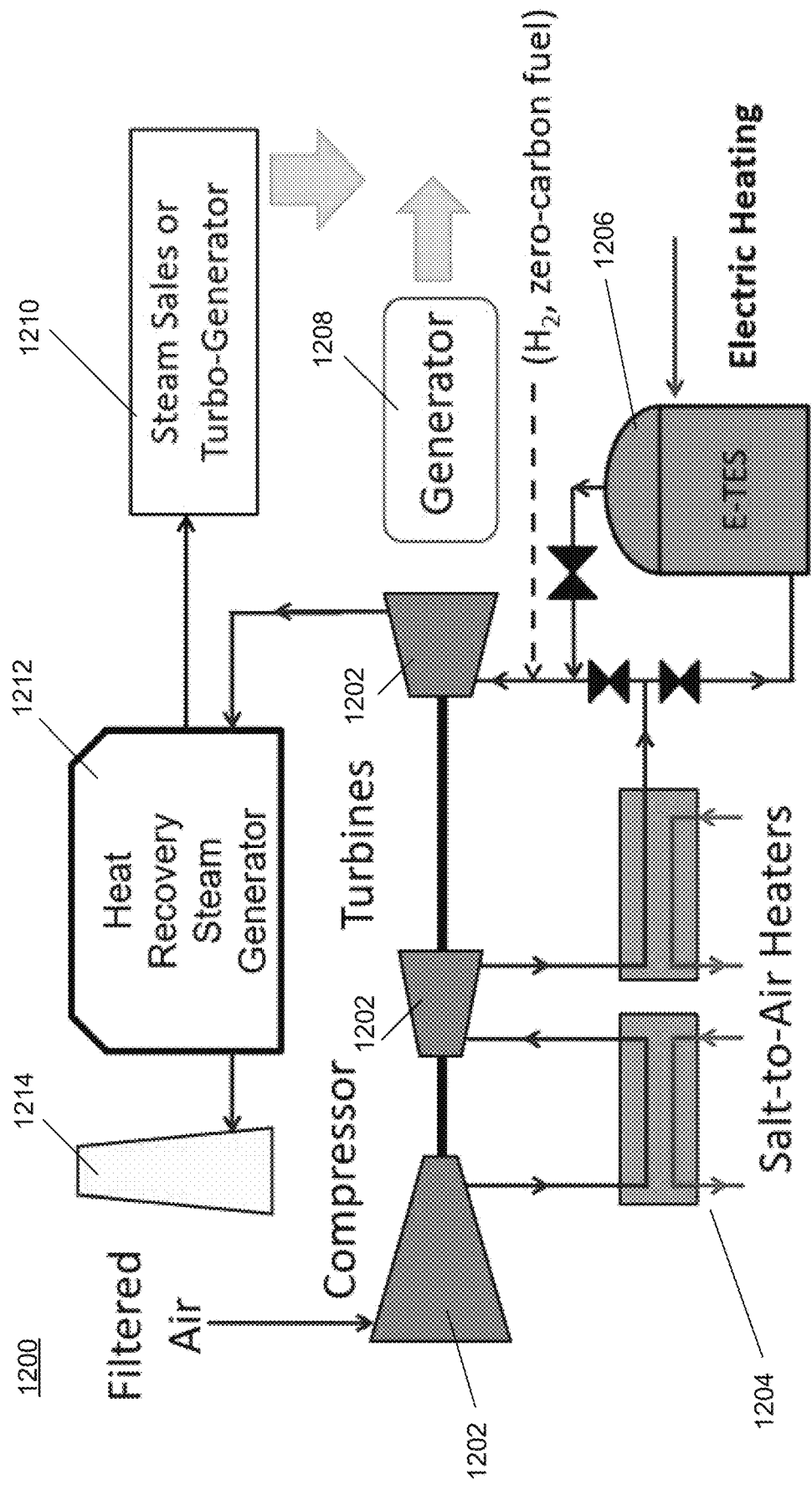
FIG. 12 is a block diagram of an illustrative nuclear power system employing an E-TES system in accordance with described embodiments.

FIG. 12 shows an embodiment of an E-TES system which may be employed with air cycle systems, for example, in nuclear or solar power plants. As shown, power plant system 1200 may include E-TES system 1206 which receives cold air from one or more salt-to-air heaters 1204, and provides heated air to turbines 1202, which may in turn drive generator 1208 and/or heat recovery steam generator 1212. A zero-carbon fuel may be added to the output of the E-TES system 1206 to increase or otherwise adjust the temperature to a desired range prior to input into the turbines. In one example implementation, this E-TES system may achieve a roundtrip electrical efficiency of 65-70% or greater, but may attain a different level of efficiency.

Figure 13:
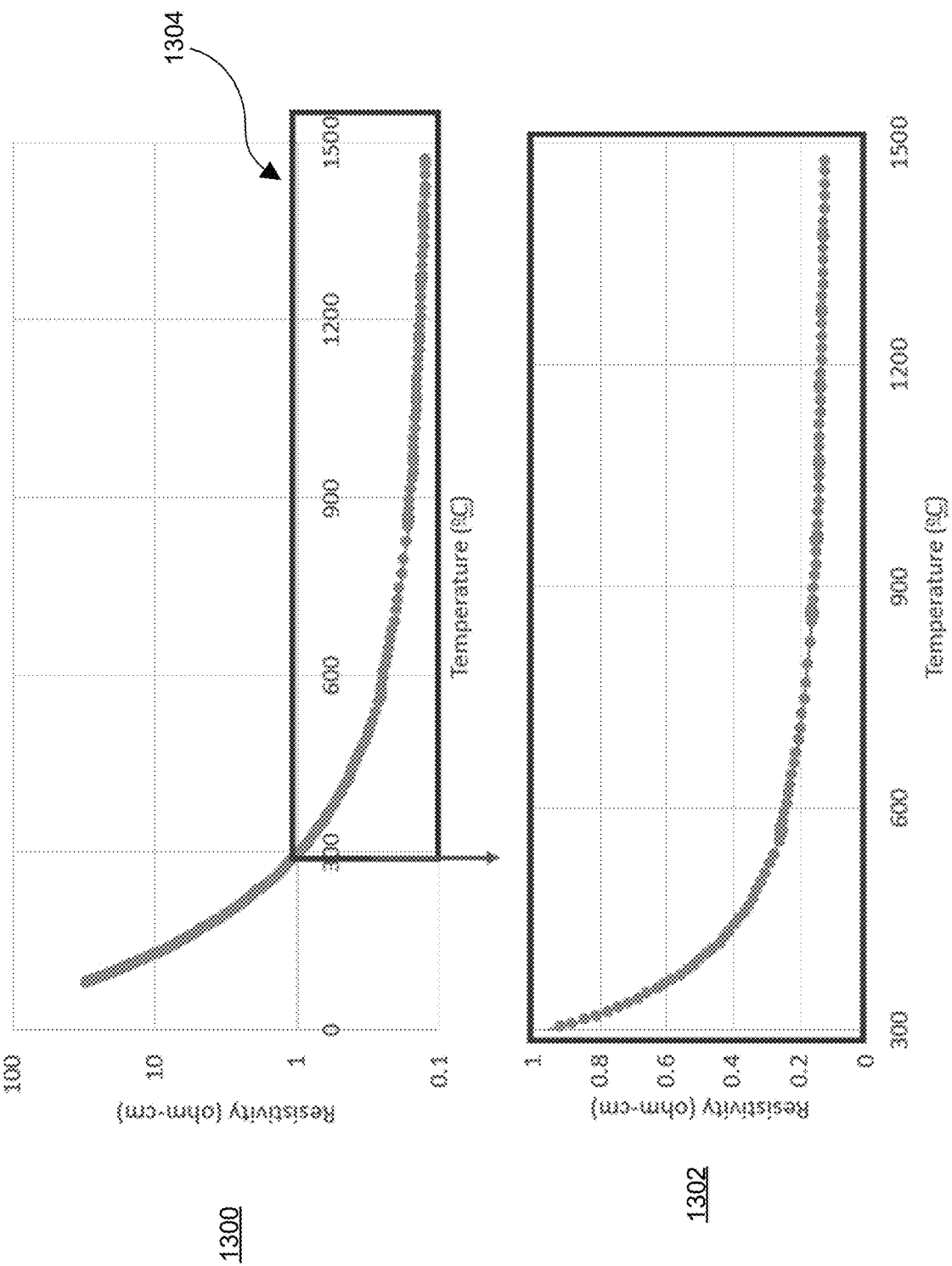
FIG. 13 is a pair of plots of resistivity over temperature of firebricks employing doped chromium oxide in accordance with described embodiments.

FIG. 13 shows a first plot 1300 showing an example of resistance over temperature of doped chromium oxide firebricks. Plot 1302 shows a magnified view of the area of plot 1300 indicated by square 1304. As shown, doped chromium oxide firebricks achieve very low resistivity (<0.5 Ω-cm) that is nearly linear between 900 and 1500° C.

Therefore, in accordance with one or more embodiments, E-TES systems are provided which may be useful for industrial and/or combined cycle plant applications operating at mid-to-high temperatures. These may be ones which, for example, use mid-temperature heat (e.g., <500° C.) such as steam systems, chemical plants, paper mills, etc., and may also be ones useful for high temperature heat applications (e.g., ~0.800-2000° C.) such as steel, aluminum, cement, glass, and other high temperature industrial processes.

After reading the descriptions provided herein, it will thus be appreciated that the heat storage system and other embodiments described herein can provide heat to all types of heat users and heat-related applications (e.g., an industrial application, commercial application, residential application, transportation application, etc.). Some of these applications may relate to electricity production, but other applications may relate to other purposes that require heat that are unrelated to heat production. Thus, while one or more embodiments may serve in some cases as an effective replacement for a battery, other embodiments may be used in various other contexts such as for providing heat for virtually any purpose.

As used herein the term "metal oxides" generally refers to any polymer, molecule or solid that contain a metal or metalloid cation and an oxide anion. These include, but are not limited to, transition metal oxides, rare earth metal oxides, alkali metal oxides and alkaline earth metal oxides. Structures include, but are not limited to binary monoxides, MO, dioxides, $MO_2$, sesquioxides, $M_2O_3$, cuprite oxides, $M_2O$, as well as multi-metal oxides, including but not limited to spinel structures, $MN_2O_4$, and perovskites $MNO_3$, where M and N are different metal species.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

To the extent directional terms are used in the specification and claims (e.g., upper, lower, top, bottom, parallel, perpendicular, etc.), these terms are merely intended to assist in describing various embodiments and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner in which energy is transferred between two or more elements.

It should be understood that the steps of the illustrative methods set forth herein are not necessarily required to be performed in the order described. Likewise, additional steps may be included in such methods, and certain steps may be omitted or combined, in methods consistent with various embodiments.

It will be further understood that various changes in the details, materials, and arrangements of the parts which have been described and illustrated in order to explain the nature of the described embodiments might be made by those skilled in the art without departing from the scope of the following claims.

We claim:

1. A thermal energy storage system comprising:
a firebrick checkerwork comprising one or more conductive firebrick layers, each conductive firebrick layer comprising a plurality of electrically conductive semiconductor-doped metal oxide firebricks having one or more vents to allow airflow through the firebrick checkerwork; and
a first electrode comprising one or more electrode firebrick layers, each electrode firebrick layer comprising a plurality of electrode firebricks, the first electrode configured to receive electrical power from a source;
wherein the firebrick checkerwork is heated due to application of the received electrical power, and wherein air flowing through the firebrick checkerwork is heated by the firebrick checkerwork.

2. The system of claim 1, further comprising:
a second electrode comprising one or more electrode firebrick layers, each electrode firebrick layer comprising a plurality of electrode firebricks;
wherein the firebrick checkerwork comprises a plurality of electrically isolated checkerwork portions and the first electrode comprises a plurality of electrically isolated electrode portions; and
wherein the second electrode is configured to electrically couple two or more of the electrically isolated checkerwork portions of the firebrick checkerwork to form an electrical transmission path through the firebrick checkerwork.

3. The system of claim 2, wherein each of the plurality of electrically isolated electrode portions is configured to receive an isolated electrical phase from the source.

4. The system of claim 2, wherein the second electrode is configured to provide a neutral point for electrical power provided as 3-phase power and wherein the thermal energy storage system operates in a wye configuration.

5. The system of claim 2, wherein:
the second electrode comprises a plurality of electrically isolated second electrode portions, and
the plurality of electrically isolated checkerwork portions, the plurality of electrically isolated electrode portions, and the plurality of electrically isolated second electrode portions are configured to provide an electrical path through each electrically isolated checkerwork portion.

6. The system of claim 5, wherein a number of snaking portions of each electrical path is an even number for the thermal energy storage system to operate in a 3-phase delta configuration, and wherein the number of snaking portions of each electrical path is an odd number for the thermal energy storage system to operate in a 3-phase wye configuration.

7. The system of claim 1, further comprising one or more insulating layers, the insulating layers comprising one or more insulating firebrick layers, each insulating firebrick layer comprising a plurality of non-conductive firebricks having one or more vents for allowing airflow through the firebrick.

8. The system of claim 7, wherein the non-conductive firebricks comprise one or more of alumina, magnesia, or silica.

9. The system of claim 1, wherein the electrically conductive semiconductor-doped metal oxide firebricks comprise one of: chromium oxide doped with nickel, chromium oxide doped with magnesium, nickel oxide doped with lithium, nickel oxide doped with copper, zinc oxide doped with aluminum, stabilized zirconium oxide doped with cerium, and titanium oxide doped with niobium.

10. The system of claim 9, wherein the electrically conductive semiconductor-doped metal oxide firebricks are doped with a concentration of approximately $10^{20}/cm^3$.

11. The system of claim 1, wherein the electrode firebricks comprise one of:
chromium oxide doped with nickel, chromium oxide doped with magnesium, nickel oxide doped with lithium, nickel oxide doped with copper, zinc oxide doped with aluminum, stabilized zirconium oxide doped with cerium, or titanium oxide doped with niobium.

12. The system of claim 11, wherein the electrode firebricks are highly doped with a concentration of approximately $10^{21}/cm^3$ to be highly conductive and provide low heat generation.

13. The system of claim 11, wherein a dopant mix is approximately 2% to 5%.

14. The system of claim 1, wherein the firebrick checkerwork is heated to a temperature between 1000° C. and 2000° C.

15. The system of claim 1, wherein the electrically conductive semiconductor-doped metal oxide firebricks comprise a high temperature metal oxide doped with a metal of a different valency.

16. The system of claim 15, wherein the electrically conductive semiconductor-doped metal oxide firebricks further comprise an electrically inactive oxide.

17. The system of claim 16, wherein the electrically inactive oxide comprises one of alumina, magnesia, or silica.

18. An apparatus, comprising:
a first electrode;
a second electrode; and
electrically conductive firebricks,
wherein the electrically conductive firebricks are disposed between the first electrode and the second electrode in a predetermined pattern, each of the electrically conductive firebricks including a semiconductor-doped metal oxide material configured to generate heat based on an electric potential applied between the first electrode and the second electrode.

19. The apparatus of claim 18, wherein:
the predetermined pattern includes a plurality of overlapping layers of the electrically conductive firebricks, and
the electrically conductive firebricks are spaced to form air flow channels.

20. An apparatus, comprising:
a first electrode;
a second electrode; and
electrically conductive firebricks,
wherein the electrically conductive firebricks are disposed between the first electrode and the second electrode in a predetermined pattern, each of the electrically conductive firebricks including a doped metal oxide material configured to generate heat based on an electric potential applied between the first electrode and the second electrode;
wherein each of the electrically conductive firebricks includes a dopant concentration that corresponds to a temperature of the heat to be generated based on the potential applied between the first electrode and the second electrode.

* * * * *